United States Patent
Bharat et al.

(10) Patent No.: US 6,487,555 B1
(45) Date of Patent: Nov. 26, 2002

(54) METHOD AND APPARATUS FOR FINDING MIRRORED HOSTS BY ANALYZING CONNECTIVITY AND IP ADDRESSES

(75) Inventors: Krishna A. Bharat, Santa Clara; Andrei Z. Broder, Menlo Park; Steven C. Glassman, Mountain View; Jeffrey Dean; Monika R. Henzinger, both of Menlo Park, all of CA (US)

(73) Assignee: Alta Vista Company, Palo Alto, CA (US)

( * ) Notice: Subject to any disclaimer, the term of this patent is extended or adjusted under 35 U.S.C. 154(b) by 0 days.

(21) Appl. No.: 09/307,153

(22) Filed: May 7, 1999

(51) Int. Cl.[7] .............................................. G06F 17/30
(52) U.S. Cl. .................. 707/10; 707/103; 709/203; 709/218
(58) Field of Search .................. 707/10, 103; 709/203, 709/230

(56) References Cited

U.S. PATENT DOCUMENTS

| | | | | |
|---|---|---|---|---|
| 5,229,988 A | * | 6/1993 | Marbaker et al. | 370/245 |
| 5,708,654 A | * | 1/1998 | Arndt et al. | 370/242 |
| 5,724,510 A | * | 3/1998 | Arndt et al. | 709/220 |
| 5,751,961 A | * | 5/1998 | Smyk | 709/217 |
| 5,751,971 A | * | 5/1998 | Dobbins et al. | 709/238 |
| 5,909,677 A | * | 6/1999 | Broder et al. | 707/3 |
| 5,935,207 A | * | 8/1999 | Logue et al. | 709/219 |
| 6,105,019 A | * | 8/2000 | Burrows | 707/2 |
| 6,115,752 A | * | 9/2000 | Chauhan | 709/241 |
| 6,119,124 A | * | 9/2000 | Broder et al. | 707/103 R |
| 6,138,113 A | * | 10/2000 | Dean et al. | 707/2 |
| 6,154,744 A | * | 11/2000 | Kenner et al. | 707/10 |
| 6,154,777 A | * | 11/2000 | Ebrahim | 709/227 |
| 6,285,999 B1 | | 9/2001 | Page | 707/5 |

FOREIGN PATENT DOCUMENTS

| | | | | |
|---|---|---|---|---|
| WO | WO 98/18076 | 4/1998 | | G06F/9/46 |
| WO | WO 98/45978 | 10/1998 | | H04F/15/16 |

* cited by examiner

*Primary Examiner*—John Breene
*Assistant Examiner*—Debbie Le
(74) *Attorney, Agent, or Firm*—Fenwick & West LLP

(57) ABSTRACT

A method and system that detects mirrored host pairs using information about a large set of pages, including one or more of: URLs, IP addresses, and connectivity information. The identities of the detected mirrored hosts are then saved so that browsers, crawlers, proxy servers, or the like can correctly identify mirrored web sites. The described embodiments of the present invention use one or a combination of techniques to identify mirrors. A first group of techniques involves determining mirrors based on URLs and information about connectivity (i.e., hyperlinks) between pages. A second group of techniques looks at connectivity information at a higher granularity, considering all links from all pages on a host as one group and ignoring the target of each link beyond the host level.

31 Claims, 27 Drawing Sheets

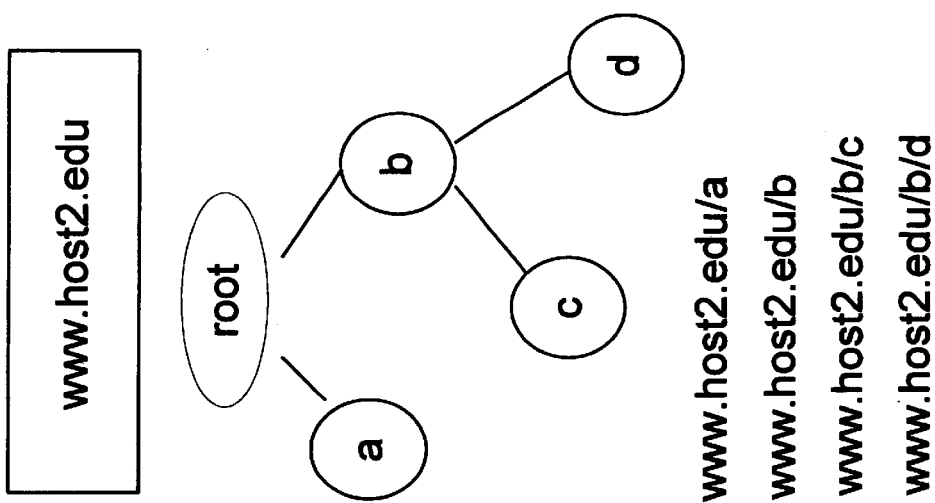
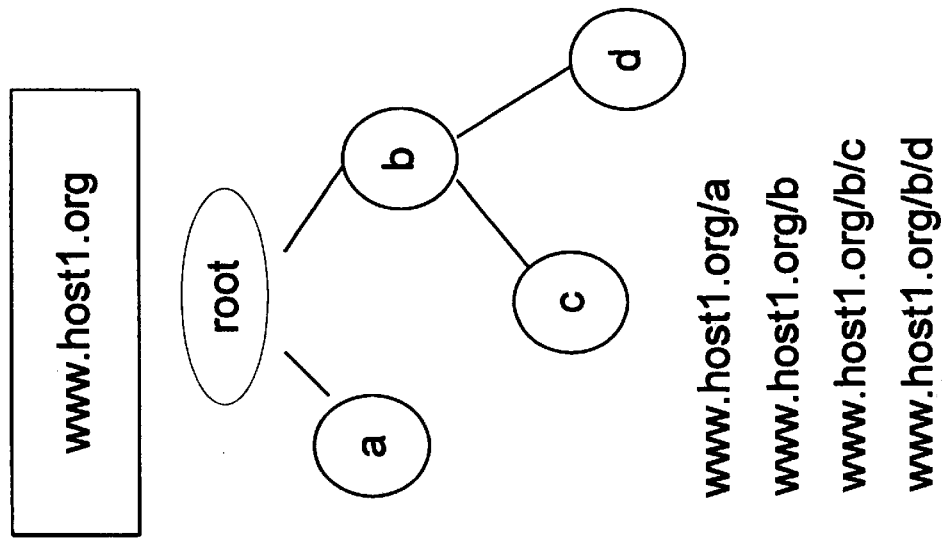
Figure 2(a)

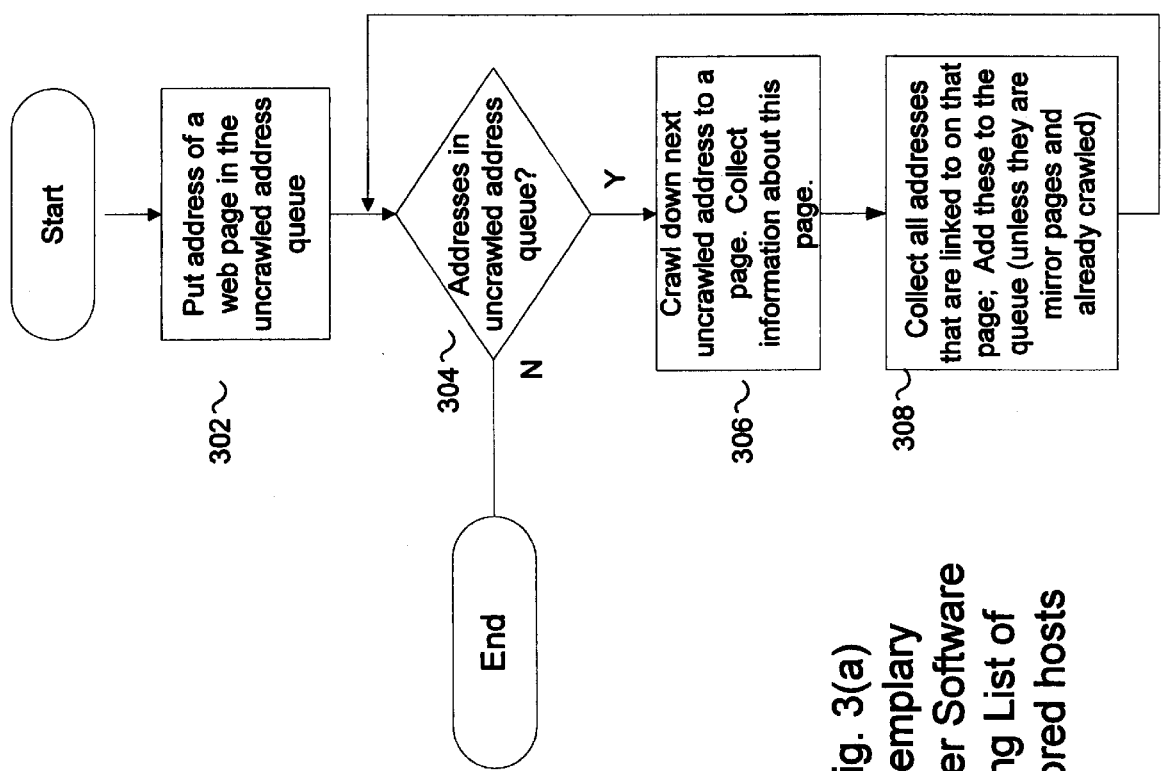
Fig. 3(a) Exemplary Crawler Software using List of Mirrored hosts

Exemplary Proxy Server
Software using List of
Mirrored hosts

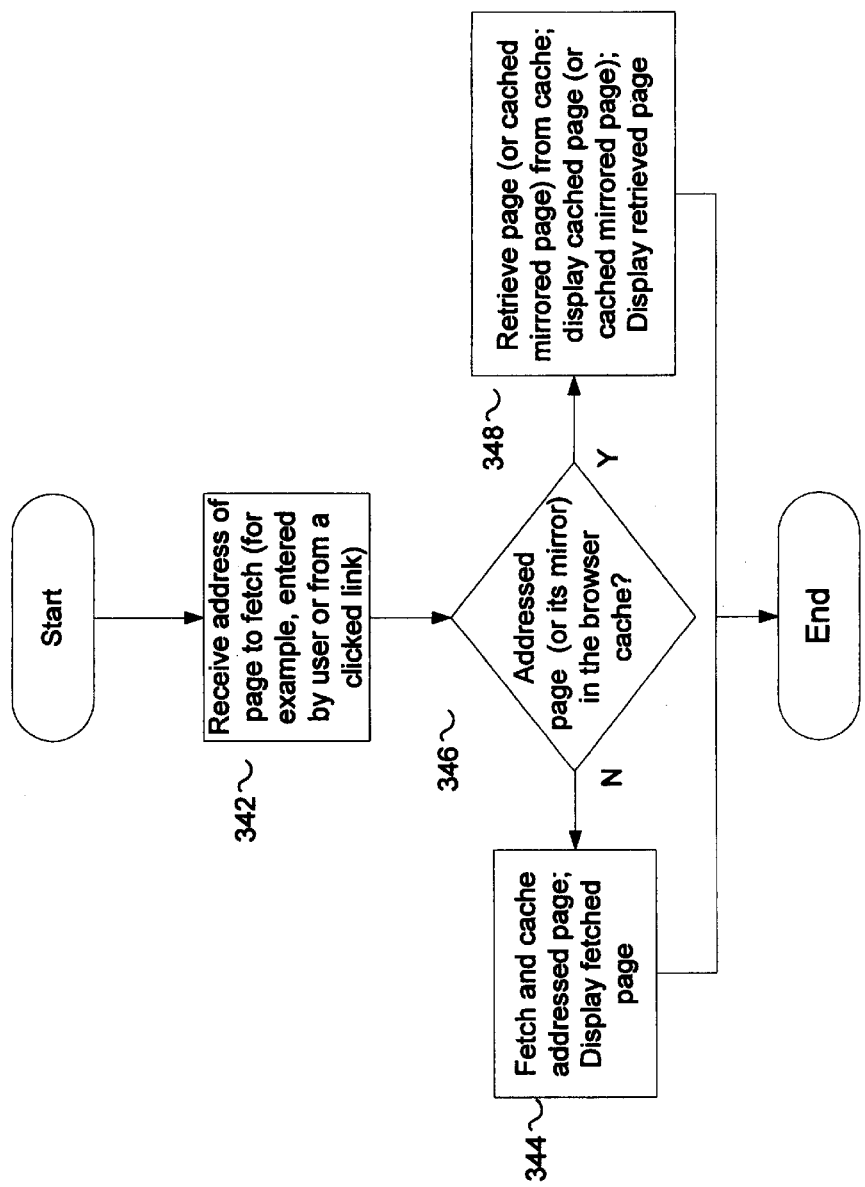
Fig. 3(c) Exemplary Browser Software using List of Mirrored hosts

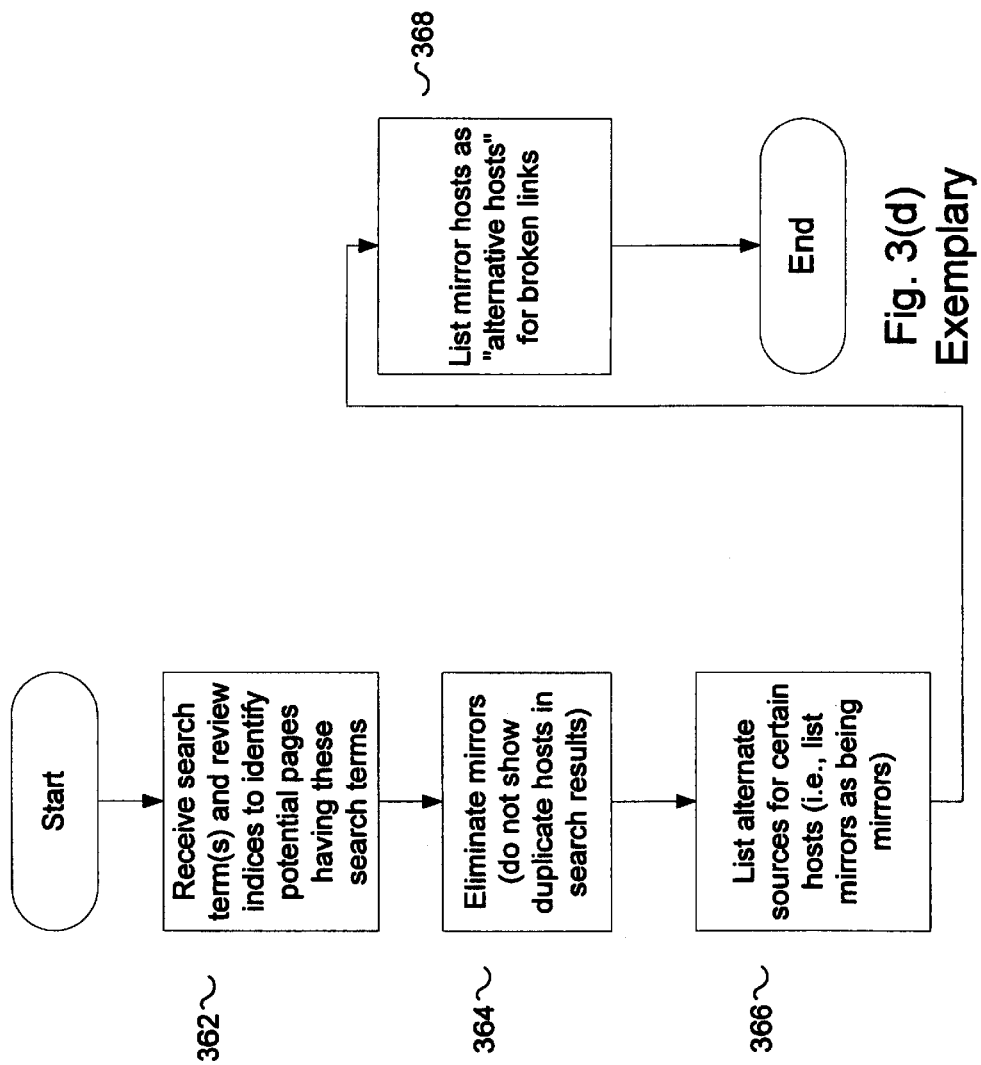

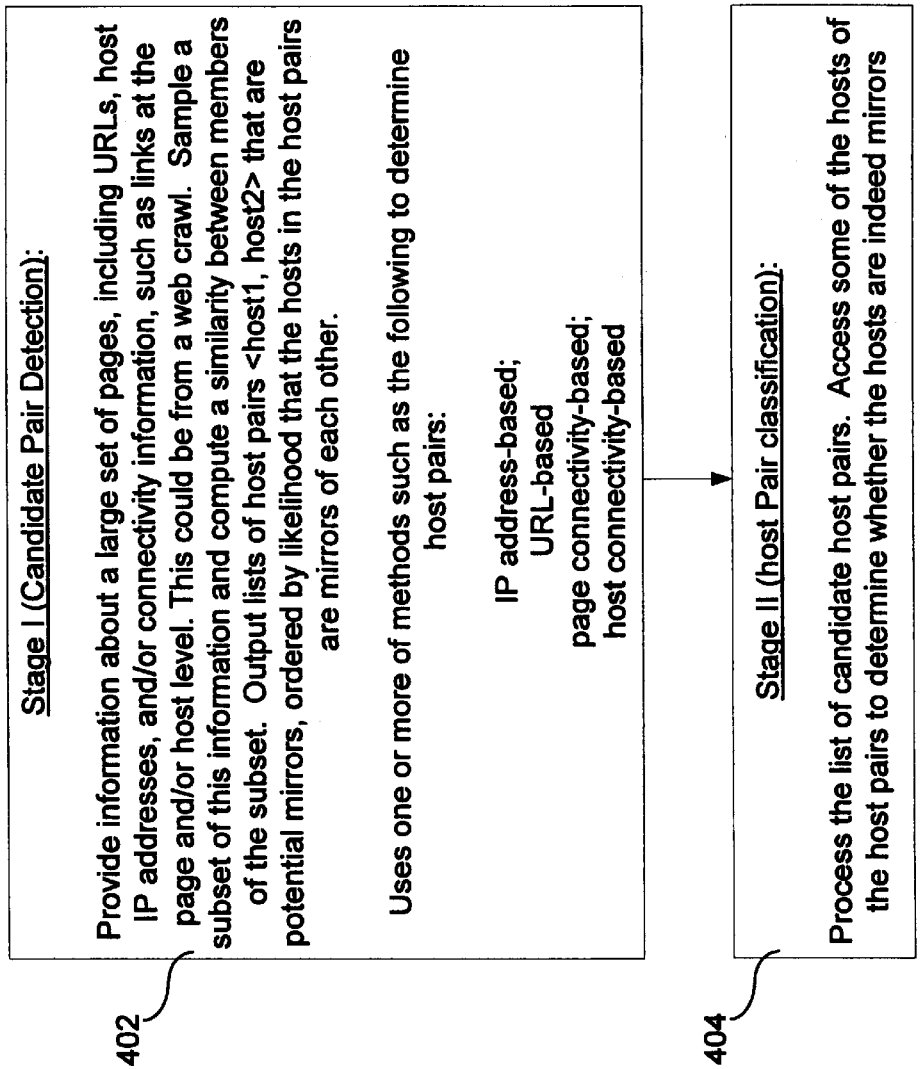

Stage I (Candidate Pair Detection):

Provide information about a large set of pages, including URLs, host IP addresses, and/or connectivity information, such as links at the page and/or host level. This could be from a web crawl. Sample a subset of this information and compute a similarity between members of the subset. Output lists of host pairs <host1, host2> that are potential mirrors, ordered by likelihood that the hosts in the host pairs are mirrors of each other.

Uses one or more of methods such as the following to determine host pairs:

IP address-based;
URL-based
page connectivity-based;
host connectivity-based

402

Stage II (host Pair classification):

Process the list of candidate host pairs. Access some of the hosts of the host pairs to determine whether the hosts are indeed mirrors

Format of an IP Address of a host

Example URL of a Page

A URL String-based Method
(Stage I)

URL: http://a.b.com/cellblock16/inmates/me/personal/foo.html

Yields bi-grams: {(cellblock,inmates,0) (inmates,me,1) (me,personal,2) (personal,foo,3) (foo,html,4)}

Yields host tuples <term,host>:
<(cellblock,inmates,0), a.b.com>
<(inmates,me,1), a.b.com>
<(me,personal,2), a.b.com>
<(personal,foo,3), a.b.com>
<(foo,html,4), a.b.com>

Fig. 8(b)

URL: http://x.y.com/cellblock17/inmates/me/personal/foo.html

Yields bi-grams: {(cellblock,inmates,0) (inmates,me,1) (me,personal,2) (personal,foo,3) (foo,html,4)}

Yields host tuples <term,host>:
<(cellblock,inmates,0), x.y.com>
<(inmates,me,1), x.y.com>
<(me,personal,2), x.y.com>
<(personal,foo,3), x.y.com>
<(foo,html,4), x.y.com>

<(cellblock,inmates,0), a.b.com>  ⎫
<(cellblock,inmates,0), x.y.com>  ⎭ H1 and H2
<(inmates,me,1), a.b.com>  ⎫
<(inmates,me,1), x.y.com>  ⎭ H1 and H2
<(me,personal,2), a.b.com>  ⎫
<(me,personal,2), x.y.com>  ⎭ H1 and H2
<(personal,foo,3), a.b.com>  ⎫
<(personal,foo,3), x.y.com>  ⎭ H1 and H2
<(foo,html,4), a.b.com>  ⎫
<(foo,html,4), x.y.com>  ⎭ H1 and H2

Fig. 8(c)

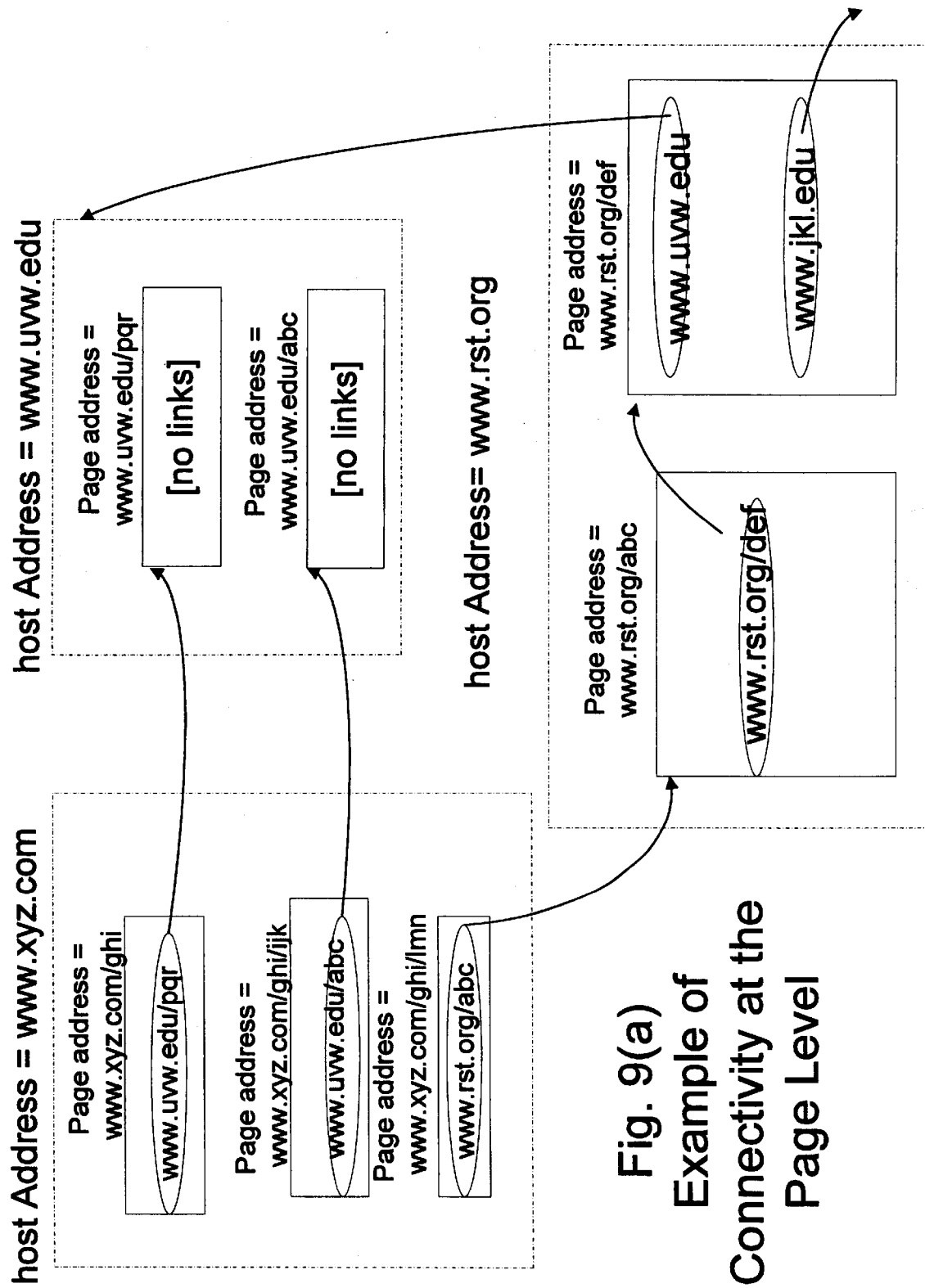
Fig. 9(a) Example of Connectivity at the Page Level

| Hosts | Host Level Connections | Frequency |
|---|---|---|
| www.xyz.com | www.uvw.edu | 2 |
| | www.rst.org | 1 |
| www.uvw.edu | — | — |
| www.rst.org | www.uvw.edu | 1 |
| | www.jkl.edu | 1 |

Fig. 9(c)
Connectivity at
the Host Level

| Pages | Page Level Links |
|---|---|
| www.xyz.com | — |
| www.xyz.com/ghi | www.uvw.edu/pqr |
| www.xyz.com/ghi/ijk | www.uvw.edu/abc |
| www.xyz.com/ghi/lmn | www.rst.org/abc |
| www.uvw.edu | — |
| www.uvw.edu/abc | — |
| www.rst.org | — |
| www.rst.org/abc | www.rst.org/def |
| www.rst.org/def | www.uvw.edu jkl.edu |

Fig. 9(b)
Connectivity at
the Page Level

Page level connectivity

Example of Matches at the Page Level
(current path of 2*n paths is www.xyz) (path www.xyz matches 100% in each case)

Example of Matches at the Page Level
(current path of 2*n paths is www.xyz) (path www.xyz matches 100% in each case)

Host level connectivity
(hconn1)

Host level connectivity(hconn2)

Example of combined approach
(Stage I)

Example of combined approach
(Stage I)

Test to determine whether each ranked pair is a mirrored pair (Stage II)

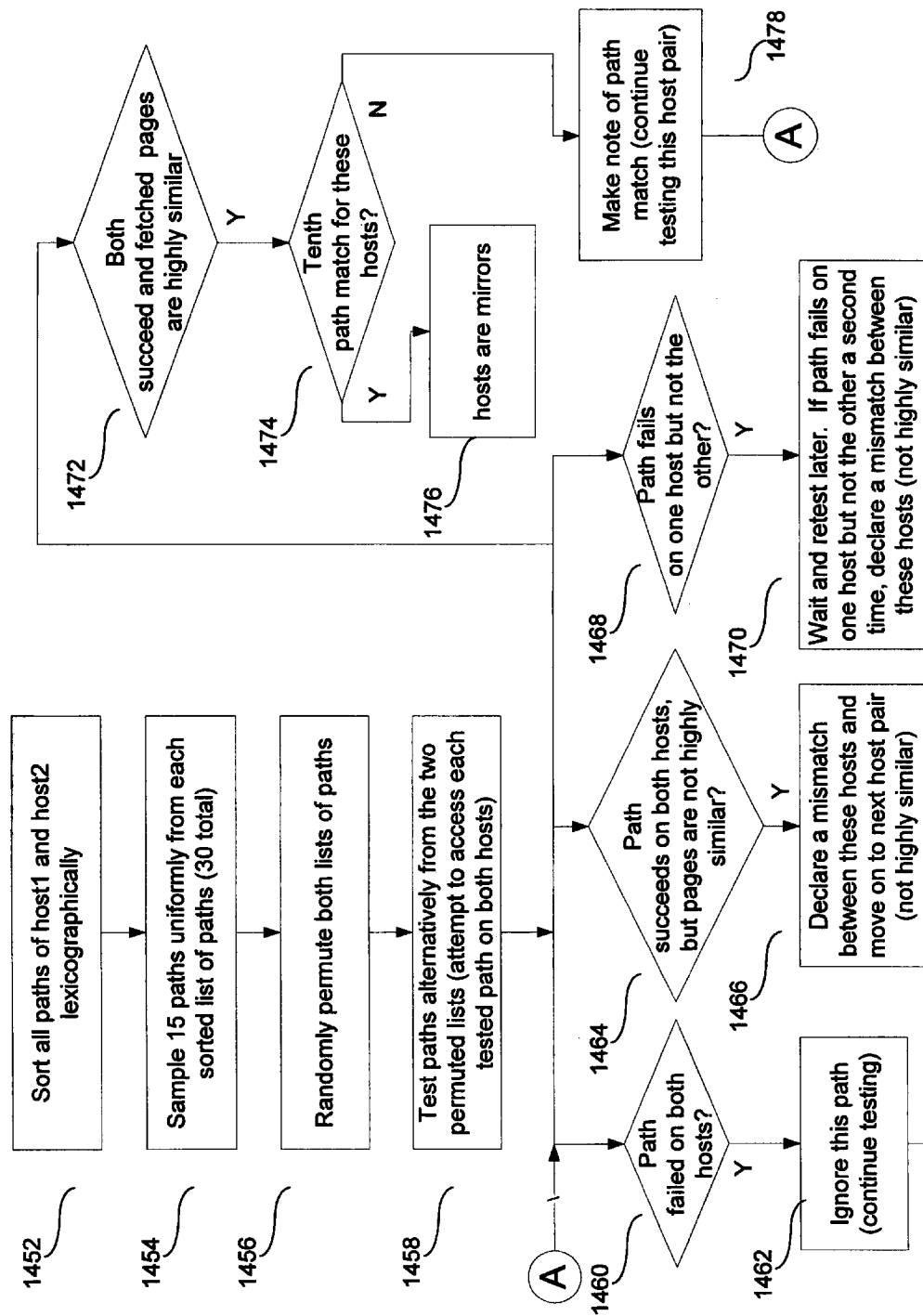
Fig. 14(b) Whether a set of paths sampled from host1 and host2 yield highly similar documents (Stage II)

if MIRROR(A,B) AND MIRROR(B,C) THEN MIRROR(A,C)

if MIRROR(A,B) AND MISMATCH(B,C) THEN MISMATCH(A,C)

Fig. 15
Exemplary pooling Evaluations
(Stage II)

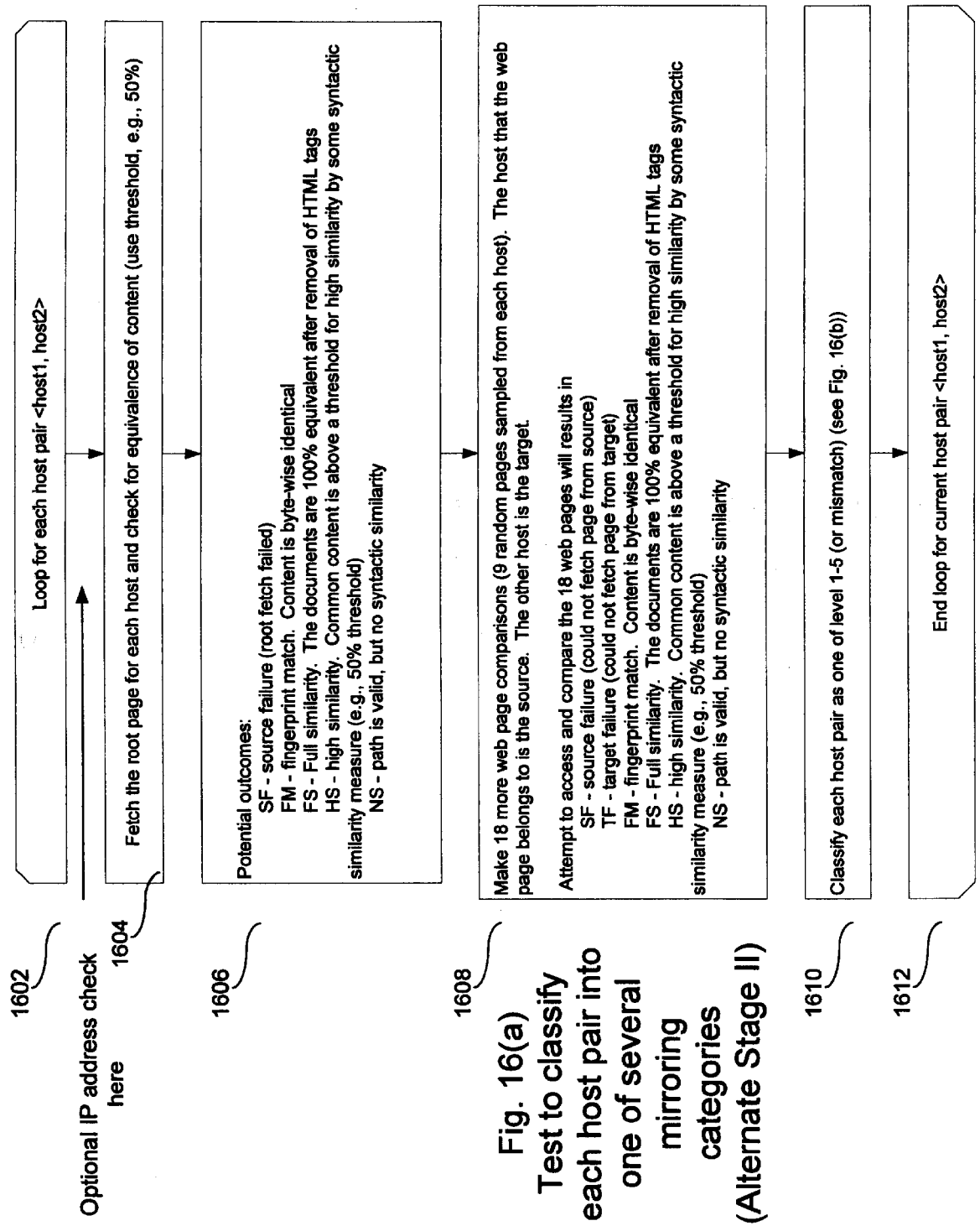
Fig. 16(a) Test to classify each host pair into one of several mirroring categories (Alternate Stage II)

Classification of a host pair (from Fig. 16(a))

Optional IP address check at classification step (Stage II)

METHOD AND APPARATUS FOR FINDING MIRRORED HOSTS BY ANALYZING CONNECTIVITY AND IP ADDRESSES

RELATED APPLICATION

U.S. patent application Ser. No. 09/307,320 of Bharat et al., entitled, "Method and Apparatus for Finding Mirrored Hosts by Analyzing URLs," which is incorporated herein by reference and which is filed on May 7, 1999, now U.S. Pat. No. 6,286,006.

U.S. patent application Ser. No. 08/665,709 of Broder et al., entitled, "Method for Determining the Resemblance of Documents," which is incorporated herein by reference and which was filed on Jun. 18, 1996.

U.S. patent application Ser. No. 09/048,653 of Broder et al., entitled, "Method for Clustering Closely resembling Data Objects," which is incorporated herein by reference and which was filed on Mar. 26, 1998 now U.S. Pat. No. 6,119,124.

BACKGROUND OF THE INVENTION

The present invention relates generally to a method and apparatus for finding mirrored hosts and, specifically, to a method and apparatus for finding mirrored hosts by analyzing connectivity and naming structures of the host and of the web pages of the host.

In recent years, the World Wide Web ("the web") has grown hugely in popularity and use. Currently, almost any type of information can be found on the web if one knows where to look. Knowing where to look has increasingly become problematic because the number of web sites that make up the web have grown at an astounding rate since the early 1990s. In recent years, increasingly sophisticated software, such as search engines and web browsers have been developed that allow users of the web to locate information in the web. Other software, such as proxy servers improve the speed and security of web usage.

A web crawler is a software program that fetches a set of pages from the web by following hyperlinks between the pages. Search engines, such as Compaq Computer Corporation's AltaVista search engine, employ crawlers to build the web page indexes used by the search engine. Web browsers are applications that fetch and display web pages to a user. Proxy servers (proxies) fetch web pages from web server systems on behalf of web browsers. For efficiency reasons, proxies and browsers sometimes cache web pages (that is, store their content locally). Thus, if a cached page is requested a second time, it can be retrieved from a local cache.

A page in the web is accessed by its web address, also called a Uniform Resource Locator (URL). The URL of a web page has three parts: 1) an access type (such as "http") 2) a host name, which identifies the host on which the page is stored, and 3) a path, which specifies a location within the host. A web site is made up of one or more web pages. As shown in FIG. 7, the format of a URL of a web page looks like:

<access type>://<host>/<path> where <host> is the name of the web server that stores the web site and <path> is the path of the page within the web server.

It has become increasingly common to duplicate all or part of certain popular web sites. For example, download hosts for certain popular software are often "mirrored" so that users can obtain the same downloadable software from any one of the mirrored hosts. Mirroring is the systematic replication of content across hosts. Mirroring happens when distinct hosts provide access to copies of the same data. Because mirrored hosts allow users to obtain the same information from any of the mirrored hosts, mirroring helps avoid bottlenecks at popular hosts. Hosts are mirrored for a variety of other reasons. Mirrored hosts may have identical page structures or they may contain only certain pages and page structures that are identical. In this document, two separate tests are used when determining mirrors. In a first test, two hosts, A and B are "mirrors" if and only if for every document on host A there is a highly similar document on B with the same path and vice versa. A second test categorizes pairs of hosts according to a plurality of mirroring categories, where the categories represent degrees of miroring. The two hosts do not have to be exactly matched in structure and/or content to be mirrored hosts.

Crawlers, search engines, and proxy servers all fetch large numbers of pages on the web. If these programs could detect mirroring in hosts, they could refrain from fetching content from all but one of the mirrored hosts, thus reducing the number of pages fetched and improving their overall performance. Given a large list of URLs encountered on the web (such as a list collected by a crawler of the list of URLs viewed by a central proxy of a large Internet Service Provider) it is desirable to be able to determine which hosts are mirrored. Some specific examples are provided below.

Often search engines index only one copy of a mirrored page. In the process, they may fetch replicas and discard them. If mirroring information were available, a search engine could avoid fetching replicas from known mirrored hosts. The search engine could also distribute fetches of the remaining pages between the mirrors for load balancing, or choose the best mirror in terms of response time.

Proxy servers and web browsers maintain cached copies of downloaded pages to avoid re-fetching. The effectiveness of such caches can be increased if mirroring information is available. When a URL needs to be fetched, the cache is first checked. If a requested page has not yet been fetched, but it is determined that a page from a mirrored host with the same path has been fetched and is available in the cache, the cached mirror page can be used instead of fetching the requested page.

Thus, the ability to identify mirrored hosts would improve the speed and efficiency of operation of software accessing the world wide web.

Certain conventional web crawling software are able to identify some mirrored web sites by using Domain Name Server (DNS) lookup. When a crawler fetches a URL, it needs to first convert the hostname of the URL to a corresponding Internet Protocol (IP) address to establish a network connection. Such lookups are done using a service known as DNS. A DNS lookup returns one or more IP address for each hostname. Crawlers usually treat hosts that have an IP addresses in common as mirrors to avoid redundant fetching. This method does not always identify all mirrored hosts and may mis-identify some hosts as mirrored that are not mirrored. For example, a "virtual host" is a host that hosts more than one web site but has a single IP address. The web sites hosted by a virtual host web server, while all having the same IP address are not necessarily mirrors. Similarly, not all mirrored hosts share a common IP address. In addition, some hosts may have more than one IP address. Thus, IP matching alone is not always sufficient to prove that two hosts are mirrors of each other.

SUMMARY OF THE INVENTION

The described embodiment of the present invention addresses not only the problem of finding identical mirror hosts, but also the problem of finding hosts that are not completely identical, but contain a significant amount of shared content. This information is useful in understanding the composition of the web and the collaborations ongoing between principals on the web.

The described embodiment of the invention detects mirrored host pairs using information about a large set of pages, including one or more of: URLs, IP addresses, and connectivity information. The identities of the detected mirrored hosts are then saved so that browsers, crawlers, proxy servers, or the like can correctly identify mirrored web sites. The described embodiments of the present invention use one or a combination of techniques to identify mirrors. A first group of techniques involves determining mirrors based on URLs and information about connectivity (i.e., hyperlinks) between pages. A second group of techniques looks at connectivity information at a higher granularity, considering all links from all pages on a host as one group and ignoring the target of each link beyond the host level.

In accordance with the purpose of the invention, as embodied and broadly described herein, the invention relates to a method of determining mirrored web sites, comprising: receiving information about a plurality of web sites stored on a plurality of hosts; determining a list of host pairs that are potentially mirrored hosts; and analyzing the list of pairs of potential mirrored hosts to determine which of the host pairs are mirrored hosts.

In further accordance with the purpose of the invention, as embodied and broadly described herein, the invention relates to a method of determining mirrored web hosts, comprising: receiving information about the IP addresses of a plurality of web sites stored on a plurality of hosts; determining clusters of hosts, where all web sites in a cluster have the same IP addresses; and determining that the hosts in clusters of hosts having less than or equal to a threshold number of hosts therein are mirrored web hosts.

In further accordance with the purpose of the invention, as embodied and broadly described herein, the invention relates to a method of determining mirrored web hosts, comprising: receiving information about the addresses of a plurality of web sites stored on a plurality of hosts and about page level connectivity information of the plurality of web sites and a list of potentially mirrored hosts pairs; and filtering the list of potential mirrored hosts pairs in accordance with the page level connectivity information.

In further accordance with the purpose of the invention, as embodied and broadly described herein, the invention relates to a method of determining mirrored web hosts, comprising: receiving information about the addresses of a plurality of web sites stored on a plurality of hosts and about connectivity information of the plurality of web sites; for each host, determining a set of terms for the host, indicating those hosts that are targets of incoming links from some page on the host; for each term, determining the frequency, which equals the number of such incoming links; for each host, selecting the terms with the highest frequency; for each host, weighting the terms; and using term vector matching to determine the likelihood of a pair of hosts being mirrors in accordance with the weighted terms of the pair of hosts.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2(a) shows an example of first and second mirrored hosts, where the structure of the web sites is duplicated exactly.

FIG. 3(a) is a flow chart showing an example of how web crawler software might use a list of mirrored hosts to improve its operation.

FIG. 3(c) is a flow chart showing an example of how browser software might use a list of mirrored hosts to improve its operation.

FIG. 3(d) is a flow chart showing an example of how search engine software might use a list of mirrored hosts to improve its operation.

FIG. 4 is a flow chart showing an overview of a method of finding mirrors in accordance with the present invention.

FIG. 8(b) shows an example of determining tuples in accordance with a URL.

FIG. 8(c) shows an example of determining host pairs n accordance with the tuples of FIG. 8(b).

FIG. 9(a) shows an example of a plurality of connected web sites.

FIG. 9(b) describes the page level connectivity of the web sites of FIG. 9(a).

FIG. 9(c) describes the host level connectivity of the web sites of FIG. 9(a).

FIGS. 14(a) and 14(b) are flow charts showing a method that takes a list of potential pairs of mirrors and examines mirror content and linkage to determine whether each pair represents mirrored hosts.

FIG. 15 is a flow chart representing additional details of FIG. 14.

FIGS. 16(a) and 16(b) are flow charts showing a method that takes a list of potential pairs of mirrors and examines mirror content and linkage to classify the mirror pairs as one of several types of mirrors or non-mirrors.

DETAILED DESCRIPTION OF EMBODIMENTS

Reference will now be made in detail to several embodiments of the present invention, examples of which are illustrated in the accompanying drawings. Wherever practicable, the same reference numbers will be used throughout the drawings to refer to the same or like parts.

1. General Discussion

Figure 1:
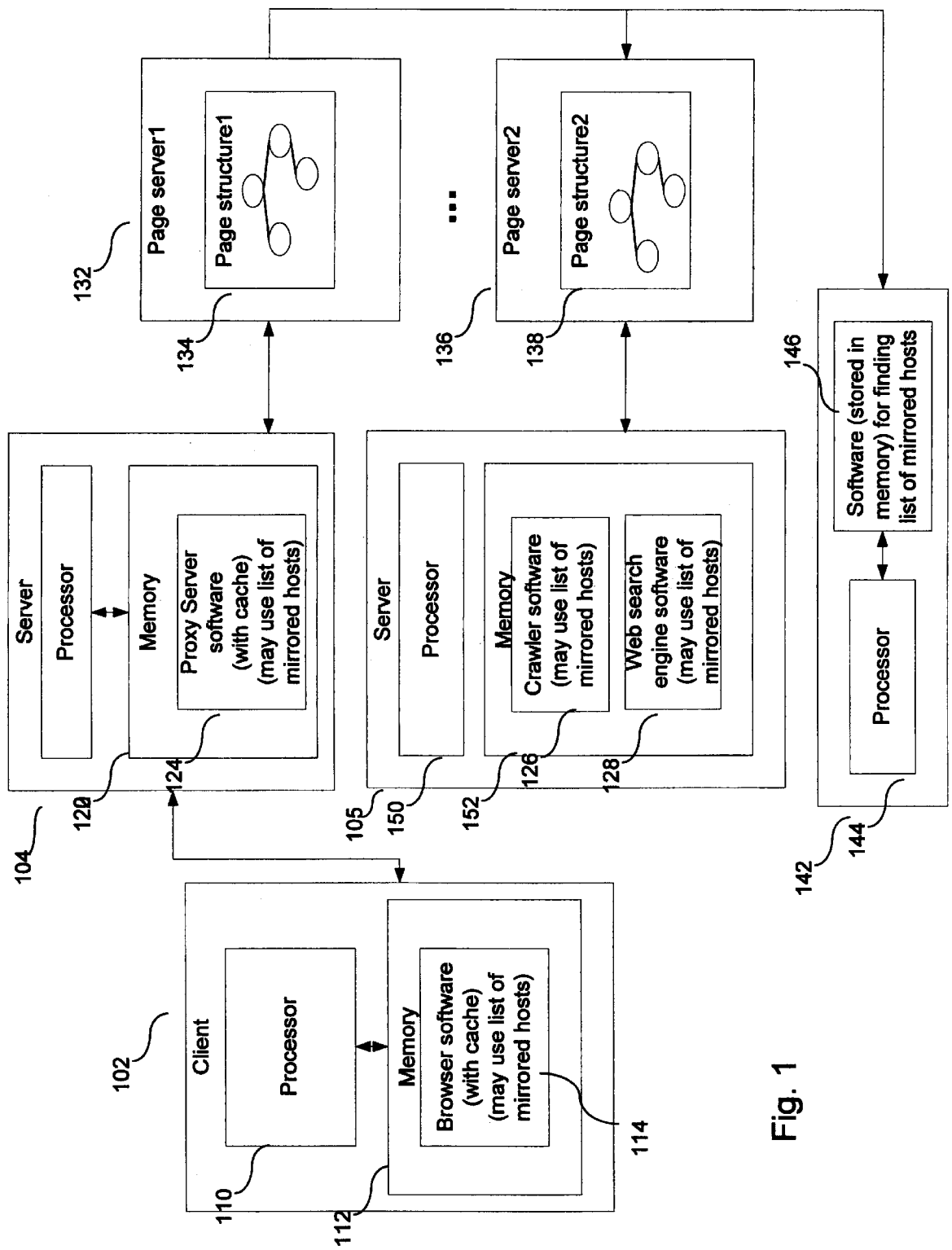
FIG. 1 shows an example having a client system, proxy server software, web crawler software, web search engine software, browser software, and a web server host in a configuration in which the present invention can be employed, along with software for determining a list of mirrored hosts in accordance with the present invention.

FIG. 1 shows an example in which a client system 102, a proxy server 104, another server 105, and a plurality of web servers 132, 136 in a configuration in which the present invention can be employed. Proxy server 104 includes proxy server software 124. Server 105 includes crawler software 126 and web search software 128. In such a system, search engine software 128 uses web crawler software (such as crawler 126) to perform analysis of a large number of hosts on web server systems, such as web server hosts 132,136. (Hosts are often also called "web hosts" or "web sites." Herein the two terms are used interchangeably). As discussed above, web crawler software 126 can use its knowledge of which hosts are mirrored to increase its crawling and caching efficiency. The information returned by the crawler 126 is used by the search engine to determine further information about mirrored hosts in order to improve the data it returns to the client. (Web crawlers can also be used by software other than search engines). Information about mirrored hosts, once determined, can also be sent to browser software 114 and/or proxy server software 124 to increase their caching efficiency.

FIG. 1 also shows a system 142 having a processor 144 and software 146 in memory that determines whether various hosts on the system are mirrored in accordance with the present invention. FIG. 1 also includes a plurality of web sites hosted by web servers 132, 136 having different IP addresses. Although not shown, more than one web site/host can share an IP address.

FIG. 2(a) shows an example of first and second mirrored web sites, where the structure of the web sites is duplicated exactly. As can be seen in the figure, each and every link in on a www.host1.org host is duplicated on the www.host2.edu host. The URLs of the pages are not identical (and the IP addresses may not be identical) but the structure of the two hosts are exact mirrors of each other. Identical structures do not necessarily mean that the page content is also identical, although, as discussed below, a certain amount of similarity is required for the hosts to be mirror hosts.

Figure 2B:
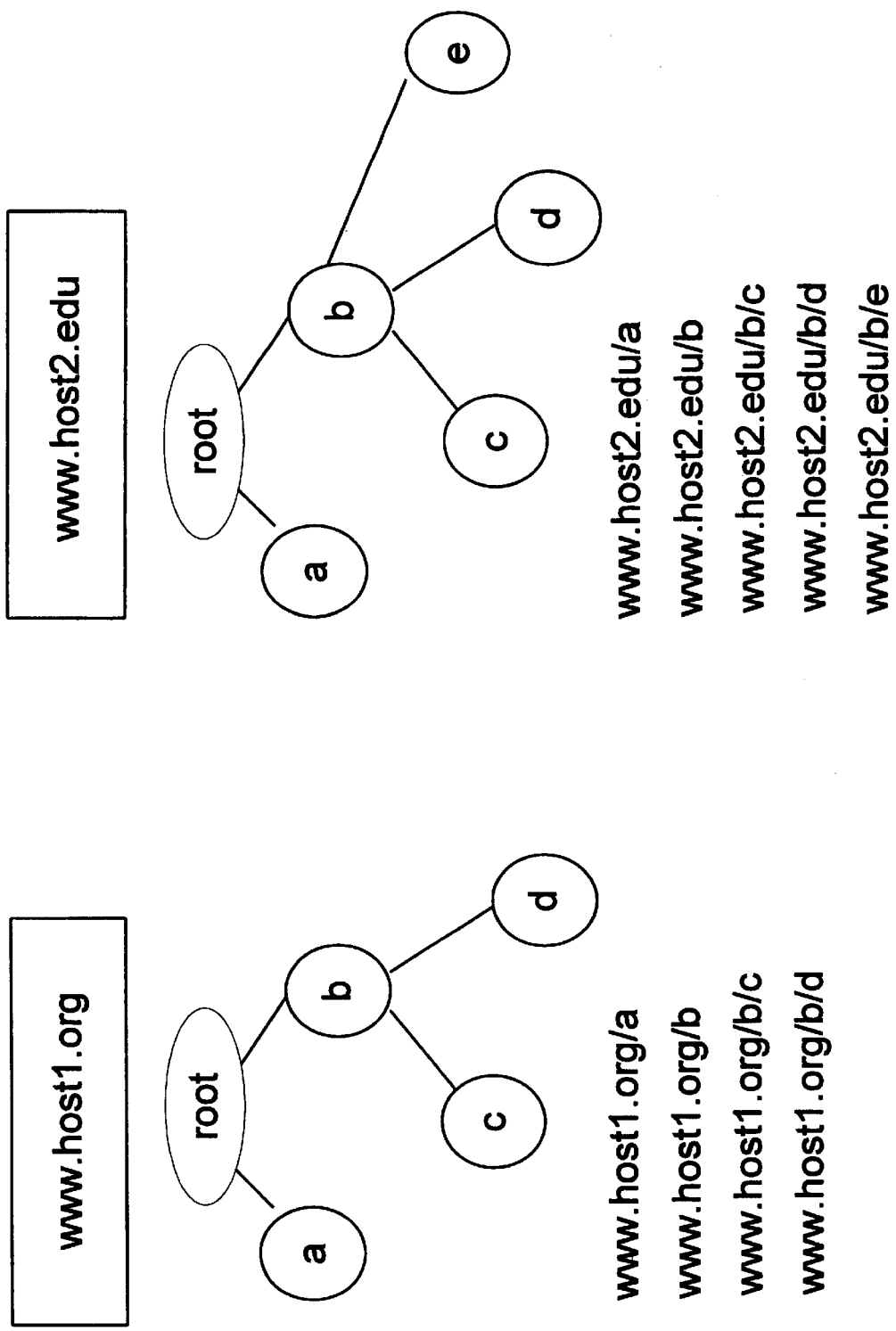
FIG. 2(b) shows an example of first and second mirrored hosts, where the structure of the web sites is not duplicated exactly.

In contrast, FIG. 2(b) shows an example of first and second mirrored web sites, where the structure of the web sites is not duplicated exactly. In the example, a new page "www.host2.edu/b/e" has been added under page "www.host2.edu/b" but the structure is otherwise the same. As discussed in connection with FIG. 2(a), the content of the pages with identical paths may or may not be the same.

2. Examples of Why it is Useful to Identify Mirror Hosts

FIG. 3(a) is a flow chart showing an example of how web crawler software might use a list of mirrored hosts to improve its operation. The list of mirrored hosts is generated, for example, by software 146 of FIG. 1. In step 302, the web crawler puts an address (URL) of an uncrawled web page in a queue. The crawler then fetches this page and collects information about the page. (step 306). The crawler then collects all addresses (URLs) that are linked to on that page (step 308). Normally, these URLs would be added to the queue and crawled in turn. In this situation, however, if the crawler can determine that a page is a mirror page of a page recently crawled, there is no need to crawl the page again. Thus, links are added to the queue unless they are mirror pages and already crawled. The crawler then fetches the next page address from the queue and repeats the process. The crawler preferably uses a lists of mirrored hosts that has been previously determined in accordance with the present invention. Alternately, the crawler may determine mirror hosts "on the fly" as it is crawling the sites (as soon as it accumulates enough information to be able to identify mirror sites form the information).

Figure 3B:
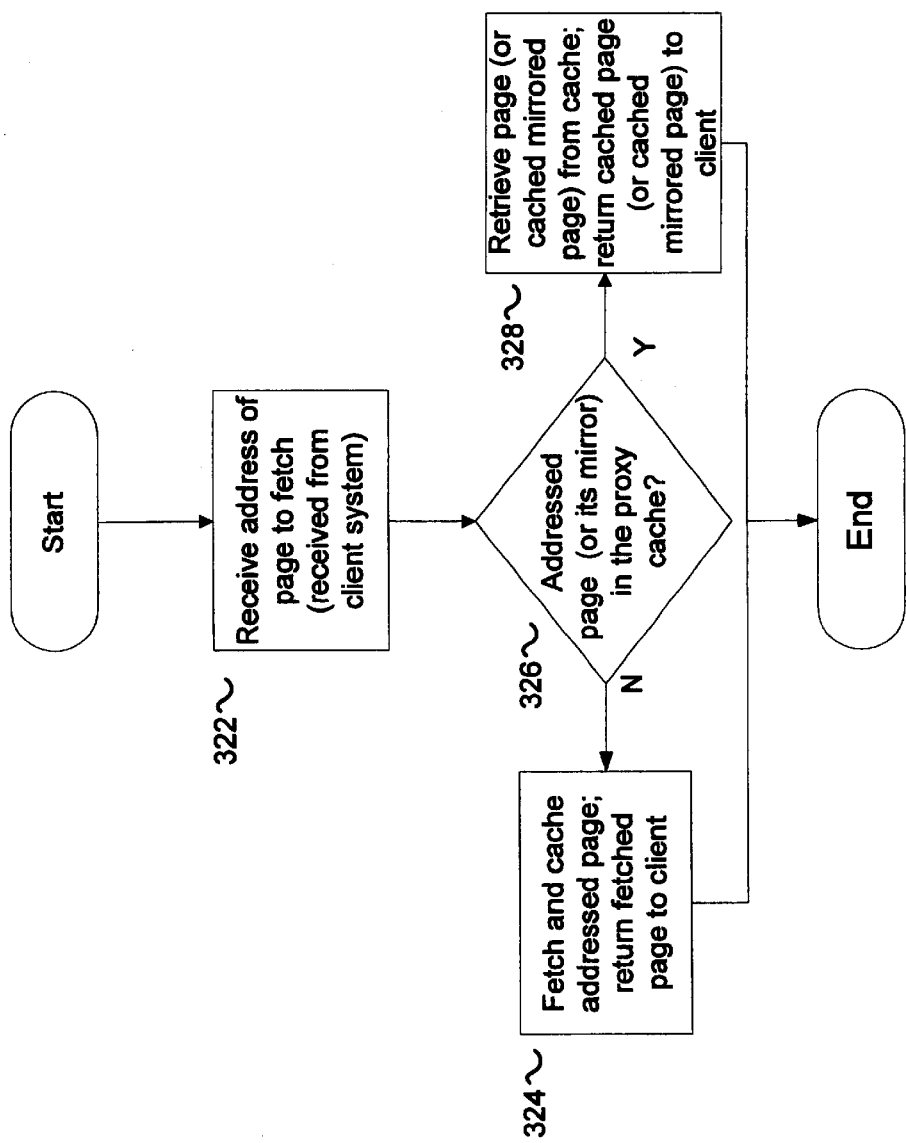
FIG. 3(b) is a flow chart showing an example of how proxy server crawler software might use a list of mirrored hosts to improve its operation.

FIG. 3(b) is a flow chart showing an example of how proxy server crawler software might use a list of mirrored hosts to improve its operation. In step 322 the proxy server receives from a client an address (URL) of a page to fetch. If, in step 326, the requested page (or a mirror of the page) is already in the proxy cache, the proxy server retrieves the page from its cache and returns it to the client (step 328). Otherwise, the proxy server fetches the page from the host server and returns the page to the client (step 324). The proxy server preferably uses a lists of mirrored hosts that has been previously determined in accordance with the present invention.

FIG. 3(c) is a flow chart showing an example of how browser software might use a list of mirrored hosts to improve its operation. In step 342 the browser receives from a user an address (URL) of a page to display. If, in step 346, the requested page (or a mirror of the page) is already in the browser cache, the browser retrieves the page from its cache and displays it (step 348). Otherwise, the browser fetches the page from the host server and then displays the page (step 344). The browser preferably uses a list of mirrored hosts that has been previously determined in accordance with the present invention.

FIG. 3(d) is a flow chart showing an example of how search engine software might use a list of mirrored hosts to improve its operation. In step 362, the search engine receives search term(s) and reviews its previously determined search index to identify potential pages having these search terms. Step 364 eliminates mirror hosts so that mirrors hosts are not shown in the search results. Alternatively, mirror hosts could be eliminated when the index of the search engine are created. Step 366 augments the search results to identify certain hosts as having mirrors (and possibly giving the URL of the mirror hosts). Step 368 identifies which search results links are broken links and attempts to replace the broken links with links to a mirror host of the broken link. It should be understood that the steps of FIG. 3(d) are exemplary only and that other search engines can use the present invention, which determines mirrors hosts, in any appropriate manner. The search engine preferably uses a lists of mirrored hosts that has been previously determined in accordance with the present invention.

3. Determining a List of Mirrored Hosts

FIG. 4 is a flow chart showing an overview of a method of finding mirrored hosts ("mirrors") in accordance with the present invention. A first step 402 (called a "Stage I" step) creates a list of potential mirrored hosts. A second step 404 (called a "Stage II" step) analyzes the structure and content of parts of the hosts in the list of potential mirrored hosts to determine whether the potential mirrored hosts are actually mirrored.

Step 402 (Stage I) step receives as input information about a large set of pages, including URLs, host IP addresses, and/or connectivity information, such as hyperlinks at the page and/or host level. This information about pages could be gathered, for example, by web crawler software or could be gathered or generated by any other appropriate methods. Step 402 samples a subset of this information and computes a similarity between members of the subset. Step 402 outputs lists of host pairs <host1, host2> that are potential mirrors, ordered by likelihood that the hosts in the host pairs are mirrors of each other.

Step 402 uses one or more methods, including but not limited to one or more of the following methods to determine host pairs:

IP address based;
URL string based;
Page connectivity based;
Host connectivity based;
Parallel combinations of the above; and
Serial combinations of the above.

Each of these methods is discussed below. The methods used to determine lists of host pairs also can be combined. An example of such as combination method is described in connection with FIG. 13 below.

Step 404 (Stage II step) processes the list of candidate host pairs to determine whether they are actually mirrors. Details of both step 402 and step 404 are provided below. Note that the methods described herein are probabilistic in nature. Hence there is a small probability that mirrored hosts will not be identified as such, or that some hosts will be declared mirrors, although they are not.

a. IP Address Based Methods for Determining a List of Potential Mirrors

Figure 5:
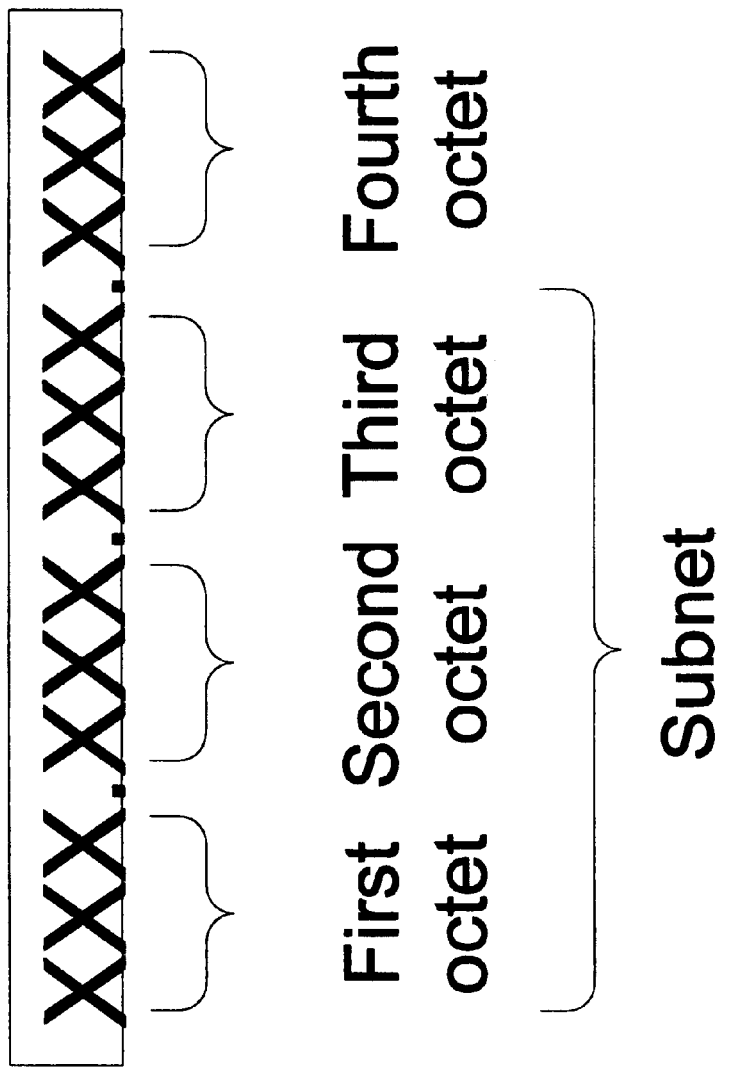
FIG. 5 is an example of an IP address format.

FIG. 5 is an example of an IP (Internet Protocol) address format in the TCP/IP protocol. An IP address is made up of four "octets." Each octet of an IP address can have a value from 0 through 255 (one byte). If exactly two hosts translate into the same IP address, it is likely that they are mirrors accessing the same server, and that the two hostnames are just aliases. In contrast, a match on the first three octets signifies web servers on a same IP subnet. Such web servers are usually part of the same organization, and are often mirrored hosts, replicated to handle heavy traffic.

When many hosts resolve to the same IP address, however, it is often indicative of a web server that is a "virtual host," i.e., that is acting as a server to more than one web site. For example, certain "big IP" servers use the same IP address for many thousands of distinct web sites. These considerations led to the methods of FIGS. 6(a) and 6(b).

Figure 6:
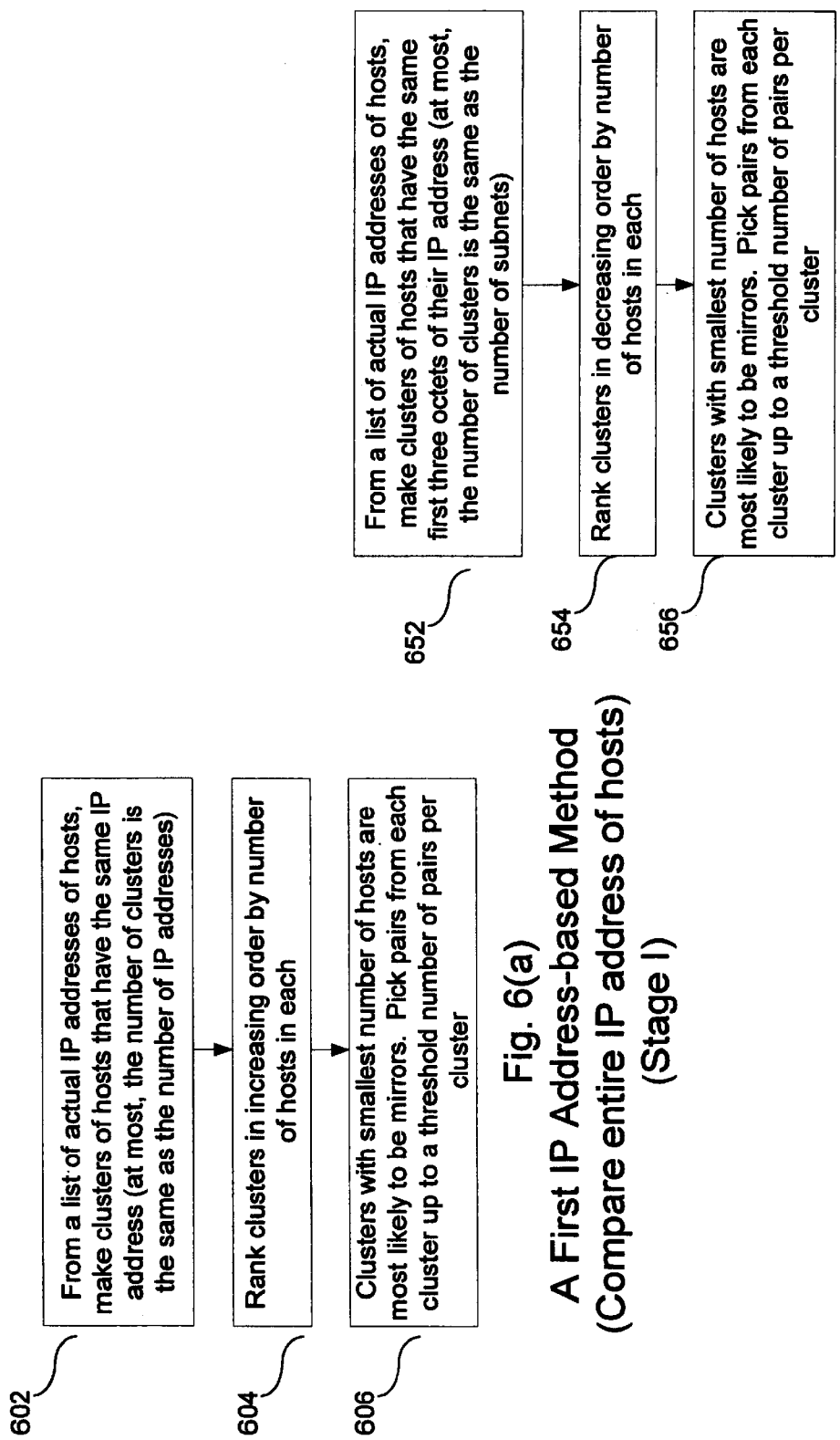
FIGS. 6(a) and 6(b) are flow charts showing methods of using IP addresses to detect mirrors.

FIGS. 6(a) and 6(b) are flow charts showing methods of using IP addresses to detect mirrors. It will be understood that all methods discussed herein are preferably implemented as software instructions stored in a memory and executed by one or more appropriate processors. The steps of Stage I and Stage II are preferably performed by software 146 of FIG. 1 or by some similar or equivalent software.

It will also be understood that any constant numerical values used herein are provided for the purpose of example only and are not to be interpreted in a limiting sense. The methods of the present invention can be used with any appropriate constant values and any appropriate threshold values and/or weights.

In FIG. 6(a), step 602 inspects the IP addresses in the input information and clusters or groups together hosts that have the same IP address. Thus, the largest number of possible IP address clusters that can be found corresponds to the largest possible number of IP addresses (i.e., one host per IP address cluster). The clusters are ranked according to the number of hosts in each. Clusters with a smallest number of members (greater than one) are most likely to be mirrors.

The method of FIG. 6(b) is performed similarly to the method of FIG. 6(a) except that, instead of considering an entire IP address, the method considers only the first three octets of an IP address.

b. URL Based Methods for Determining a List of Potential Mirrors

Figure 7:
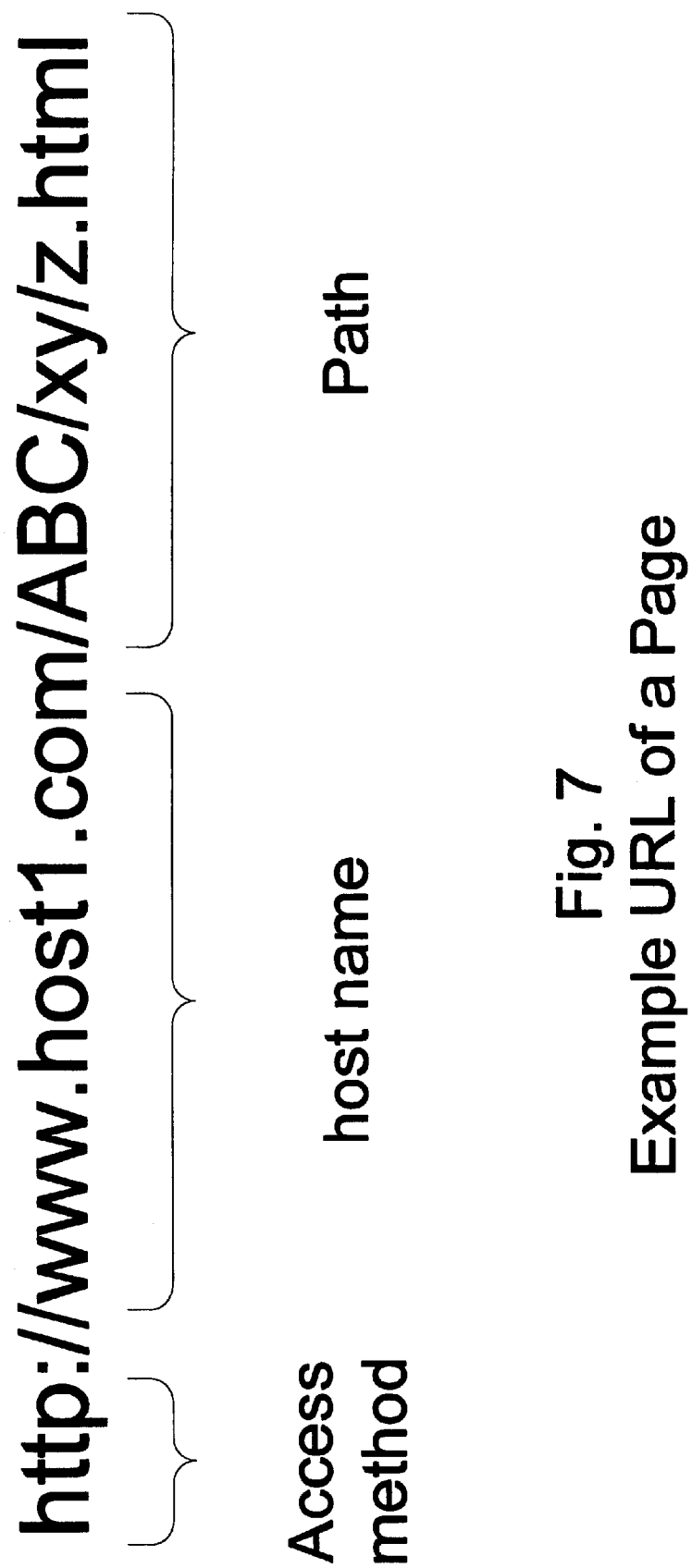
FIG. 7 is an example of a format of a URL (Uniform Resource Locator).

FIG. 7 is an example of a format of a URL (Uniform Resource Locator) used to address resources in the world wide web. A URL includes an access method (such as "http," "ftp," etc.); a host name (for example,www.host1.com); and a path identifying the path on which a particular page is located in the host structure (for example, ABC/xy/z/hmtl). Paths can be any arbitrary reasonable length.

URL strings provide information about a potential mirroring relationship between hosts in two different ways:

1) similar hostnames suggest that hosts belong to the same or related organizations.
2) similar paths indicate a possible replication of directories. This is because paths usually reflect the host's directory structure. The following embodiment uses "term vector matching" to compute the likelihood that a pair of hosts are mirrors. Term vector matching is described in G. Salton and C. Buckley, "Term Weighting Approaches in Automatic Text Retrieval," Information Processing and Management, 24(5), pages 513–523, 1988, which is herein incorporated by reference. Based on the type of term used, various methods can be used, each with an appropriate weighting scheme. The method of FIGS. 8(a)–8(c) use terms. Possible terms include: bi-grams (see below), host names, paths, and portions of a URL, such as terms preceding a slash ("/") or other terminator character.

Figure 8A:
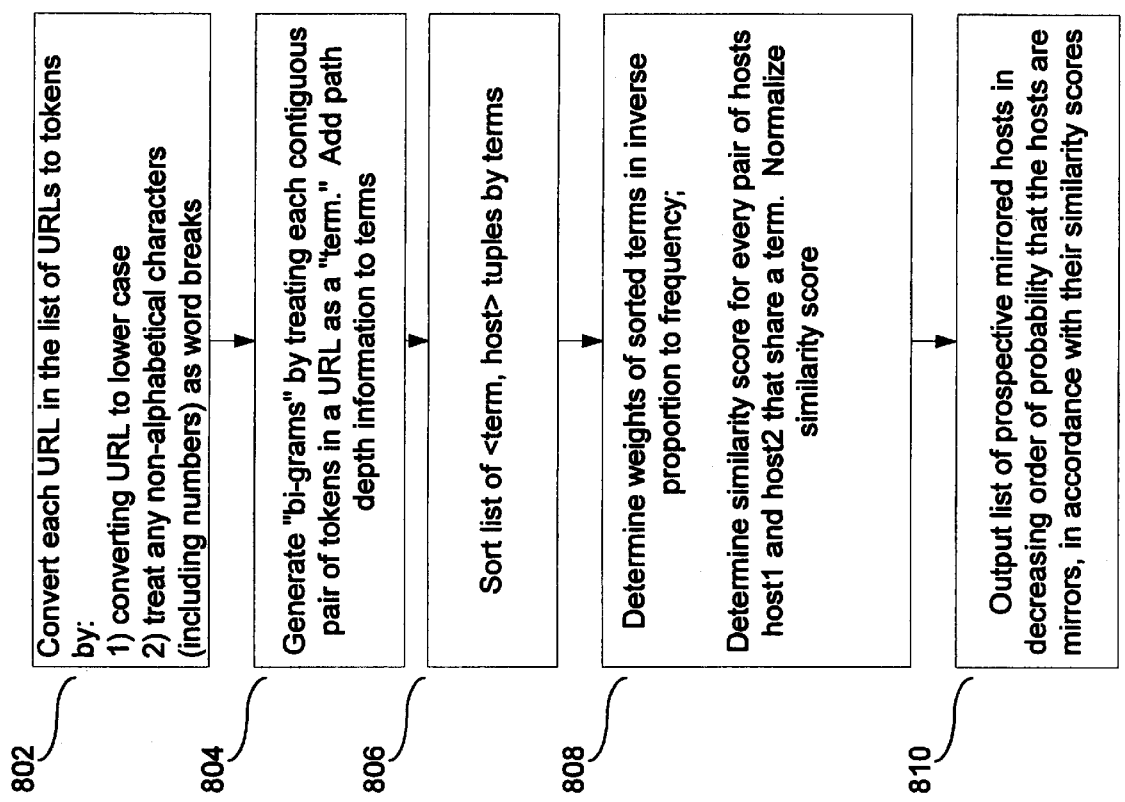
FIG. 8(a) is a flow chart showing methods of using URLs to detect mirrors.

FIGS. 8(a)–8(c) show an example of how to determine host pairs in accordance with a URL. FIG. 8(a) is a flow chart showing a method of using URLs to detect mirrors, using "bi-grams" (also called "shingles") as terms. As described below, bi-grams are pairs of tokens from a URL along with associated depth information. Instead of two tokens, n-grams with more than two tokens can be used as well. For large data sets, such as the initial data set described herein, reducing the number of terms to be considered is a priority. One way to do this is to ignore any hosts that contribute a small number of URLs to the collection. Such hosts are either small in size and hence unlikely to have much mirrored content, or poorly sampled, in which case the samples in the collection may not be very representative. The described method considers only hosts that have at least 100 URLs in the collection of data. A further data reduction is obtained as follows: for every host, we first sort the list of URLs by alphabetical order, then consider only those paths whose strings upon hashing yield a value that is 0 mod m. Any conventional hashing method for strings can be used. For example, m can initially be 5. The aim of this step is to increase the correlation between the selected paths. If a path is selected on one host, it increases the likelihood that the same path is selected on its mirror.

After the first 20 paths are sampled this way, m is doubled, and this doubling is repeated at certain thresholds. The doubling thresholds are picked so that the sample count from a host is sub-linearly proportional to size. This ensures that, on the one hand, more paths are sampled from larger hosts than smaller hosts but, on the other hand, larger hosts do not dominate the list of terms. Alternately, different or no input sample reduction need be performed.

Steps 802 and 804 of FIG. 8(*a*) generate "bi-grams" for the paths of the input data sampled as described above. Bi-grams are pairs of tokens from a URL (along with associated depth information) and are used as terms in the example method shown. An example of bi-grams is shown in FIG. 8(*b*). In step 802, each URL is converted to lower case. Paths may or may not be case-sensitive, but the hostname is. Even so, case is preferably ignored. Any non-alphabetical chacters (such as numbers) are treated as word breaks when choosing tokens. Thus, in FIG. 8(*b*), a URL of www.a.b.com/cellblock16/inmates/me/personal/foo.html will yield tokens of (cellblock, inmates, me, personal, foo, and html). In step 804, bi-grams are generated by treating every continuous pair of tokens as a term and by adding depth information concerning the level of the term in the path. For example, the example of FIG. 8(*b*) generates the following set of bi-grams for URL http://ab.com/cellblock16/inmates/me/personal/foo.html: {(Cellblock, inmates,0), (inmates, me,1), (me, personal,2), (personal, foo,3), and (foo, html,4)}. The depth information is useful when trying to find mirror hosts that share the same path structure. By fragmenting the path, we also associate depth information with the path.

In addition, the set of bi-grams may be reduced by the following three optional steps:

1) eliminate commonly used tokens such as htm, html, tst, main, index, home, bin, cgi
2) avoid URLs that have tokens such as nph, dynaweb, zyview, etc. which are characteristic of web sites created automatically by tools. Such hosts lead to spurious matching because they use a standard naming scheme.
3) eliminate path terms that do not occur at least twice on the host. This eliminates leaf patterns in the path, unless they are part of a pattern.

Step 806 groups the bi-grams as terms in <terms,host> tuples and sorts the list of tuples by the first element of the tuple (the term). For all terms, this causes all hosts that contain that term to be listed contiguously. This allows the list to be processed in a single pass in order to compute the similarity between pairs of hosts that share common terms.

It will be understood that any appropriate terms can be used in the above step, including but not limited to: host names, paths, and portions of a URL, such as terms preceding a slash ("/") or other terminator character.

Step 808 determines a similarity score for every pair of hosts, H1 and H2, in the sorted list of tuples. The similarity score for a pair of hosts need not be explicitly maintained unless it is non-zero.

The method updates the similarity score for all pairs of hosts that share a term. In the example of FIG. 8(*c*), the hosts www.a.b.com and www.x.y.com share all their terms, even though their paths differ slightly. If f is a term that is common to H1 and H2 then, similarity score is incremented by weight(f). Weight(f) is determined as follows:

$$weight(f) = S(f)/N(f),$$

where S(f) is a measure of the significance of f independent of its distribution. In the described embodiment, S(f) is set to 4 for host terms and to 1 for path terms, since a host term match offers evidence that the two hosts are part of the same organization (given that only rare terms are considered). N(f) is the number of hosts in which term f occurs. Dividing by N(f) reduces the score of terms that occur frequently and raises the score of terms that occur rarely. This is similar to the notion of IDF (inverse document frequency) weighting using in the information retrieval field. See Sparck-Jones and Willett, "Readings in Information Retrieval," Morgan Kaufinan Publishers, July 1997, which is herein incorporated by reference.

Because common terms have low weights, as an optimization, the described embodiment skips all terms that occur within more than 20 hosts. When all terms have been processed, every pair of hosts that share a rare term will have a similarity score. Step 808 normalizes and sorts the similarity scores of each host pair (H1, H2). The similarity score is normalized as follows:

$$\text{Normalized similarity\_score}(H1, H2) = \frac{k1 * \text{Similarity\_score}(H1, H2)}{k2 + \text{Log}(size\ of\ H1) + \text{Log}(size\ of\ H2)}$$

The parameters k1 and k2 help normalize the score by host size, to compensate for the fact that large hosts will have more term matches than small hosts. In the described embodiment, k1=30 and k2=20. The size of a host is the number of URLs from the host present in the input set.

At the end of this run, the normalized similarity score of every pair of hosts that share a significant term will have been computed. A list of <score,host-pair> tuples is written to a file. To reduce mismatches, host pairs having only one term in common are filtered out. Similarly, hosts pairs that do not have a path term in common are filtered out. The remaining host pairs are sorted in the descending order of normalized similarity score. Step 810 yields the output from Stage I, namely a list of potential mirrored hosts, in decreasing order of probability.

As discussed above, URL based mirror detection can also use hostnames, paths, prefixes, etc. of URLs as terms forming a term vector. Each of these is discussed below. When the terms used are substrings of hostnames, only terms occurring in less than H hosts are used in the hosts term vectors (in the described embodiment, H=100). In the described embodiment, a hostname substring is defined as a substring from a URL either beginning with the hostname or with a "." and ending either with the hostname or with ".". When the hostname is specified as an IP address, the first three octets of the IP address are used. As a further optimization, if the document frequency is greater than, for example, 25, the term is restricted to appear in the vectors of only, for example, 25 hosts chosen at random. The weight of term t is computed in terms of its document frequency df(t) and len(t), which is the number of segments obtained by breaking the term at "." characters. The weight of term t is computed as ((log(len(t))/(1+log(df(t)))). This weighting favors substrings composed of many segments that are likely to be very specific.

When the terms used are the entire path, the same document frequency based restrictions used for hostnames are used. The weight of term t is computed in terms of its document frequency df(t) and maxdf, which is the maximum document frequency of any term in the collection. Because the described embodiment discards all terms with document frequencies greater than 100, maxdf is effectively 100. The weight is computed as (1+log(maxdf/df(t))).

The terms used can also be the prefix of a path. A prefix is defined as the part of the path that either ends in a "/" or terminates the path. This results in a large number of terms per host, of which only 10 log p terms with the largest term frequency are kept, where p is the number of documents in the input set. The same weighting scheme used for path matching is preferably used. However, to compensate for the fact that smaller hosts tend to contribute fewer terms, the host similarity weight is normalized by a multiplication factor $(1/(1+0.15(\log(nt1)+\log(nt2))))$, where $nt1$ and $nt2$ represent the number of terms from each of the two hosts.

c. Connectivity Based Methods for Determining a List of Potential Mirrors

1. Page Level Connectivity Based Method

FIG. 9(a) shows an example of several connected hosts (web sites). FIG. 9(b) is a table showing page level connections between the hosts. Various pages within the hosts www.xyz.com, www.uvx.edu, and www.rst.org have links to other pages in other hosts. Pages are shown as rectangles and links are shown as oblongs within pages. The described page level method looks at the links (i.e., connectivity information) within certain pages when determining potential mirrors. In FIG. 9(b), four of the pages have one link to other pages; one of the pages has two links to other pages, and four of the pages have no links to other pages.

Figure 10A:
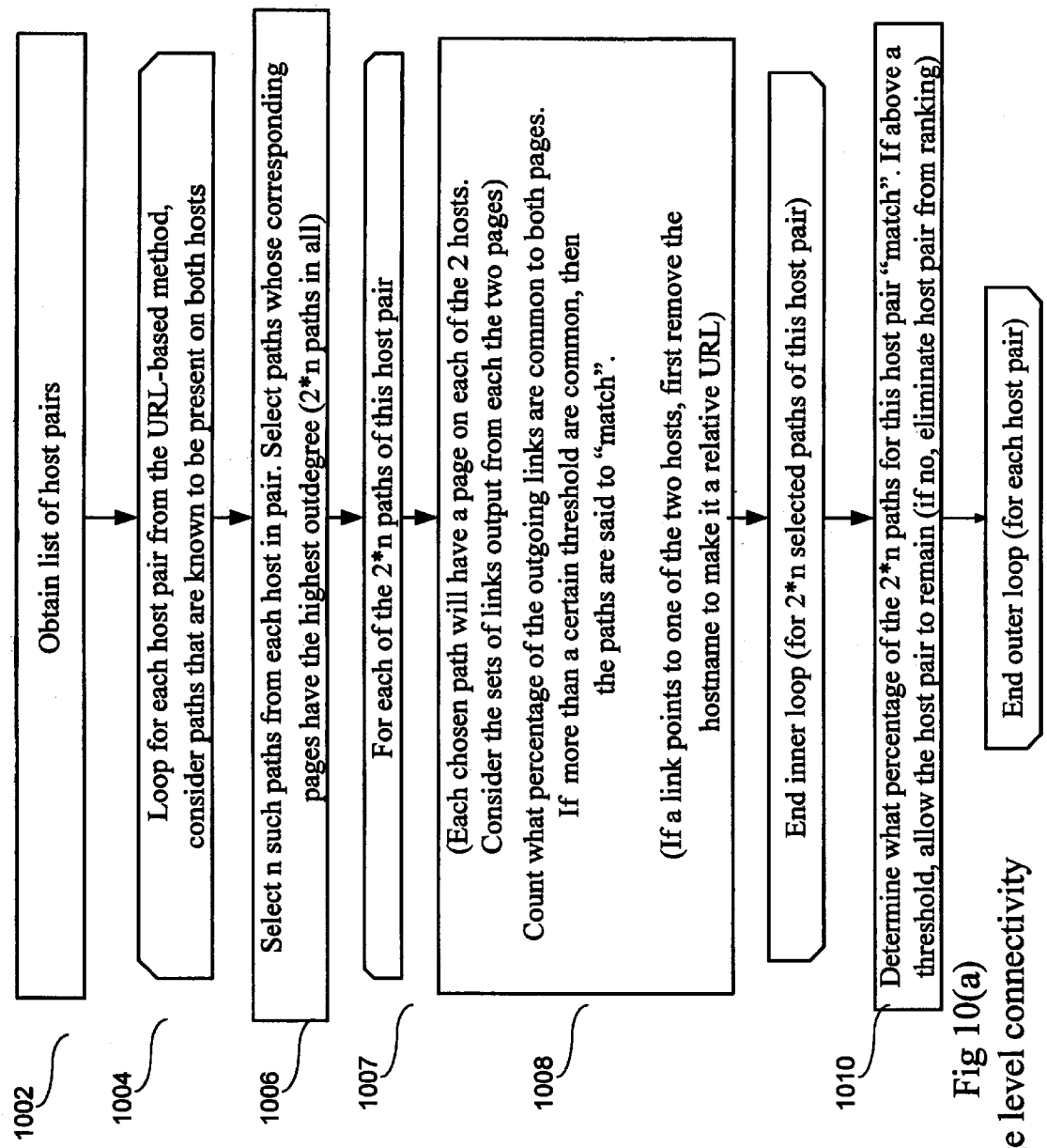
FIG. 10(a) is a flow chart showing a method of using connectivity at a page level to detect mirrors.

FIG. 10(a) is a flow chart showing a method of using connectivity at a page level to detect mirrors. This method is also known as the "conn method" (for "connectivity"). In step 1002, the described method preferably uses a URL based method similar to that described above in connection with FIGS. 8(a)–8(c) in which the terms used are "paths" (instead of bi-grams, although any appropriate URL based method could be used). This step identifies host pairs with many common paths as mirrors. The connectivity-based method involves testing further for certain paths present on both hosts of a host pair, if the corresponding pages have the same (or similar) set of out-links on both hosts under consideration. Host pairs that fail the test are eliminated.

Step 1004 loops through all host pairs. The loop considers only paths (of pages) that are known to be present on both hosts of a host pair. Step 1006 looks at the page-level connectivity of each of the hosts in the host pair. For example, hosts www.abc.com and www.def.com may have respective common paths www.abc.com/xyz and www.def.com/xyz. The described method looks at the page-level connectivity (i.e., all links going out of) of paths on the two hosts, including pages www.abc.com/xyz and www.def com/xyz.

Not all paths/pages of a host pair are looked at. Step 1006 selects n paths from each host in the host pair. The n paths correspond to n pages that are both present on both hosts in a host pair and have a highest "outdegree" for the host (n is, for example, 10). Thus, 2*n pages are selected for each host pair. An outdegree of a path is defined as the number of links from the page corresponding to the path. Thus, if path www.abc.com/xyz contains links pointing to three other pages, page www.abc.com/xyz will have an outdegree of 3. The intuition is that pages with many links are likely to produce more evidence of a mirroring relationship than those with a small number of links. Some of the selected 2*n paths may (and hopefully will) correspond to mirrored pages.

Figure 10B:
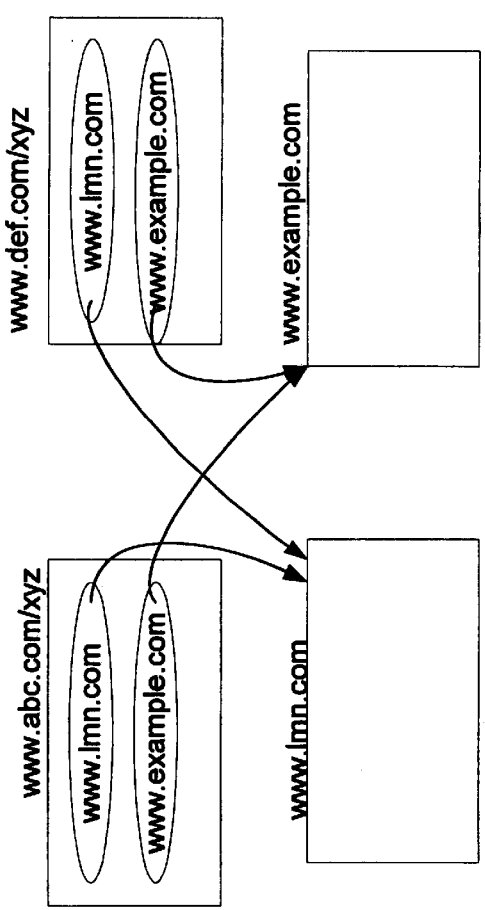
FIG. 10(b) shows an example of connectivity matches at the page level.
Figure 10C:
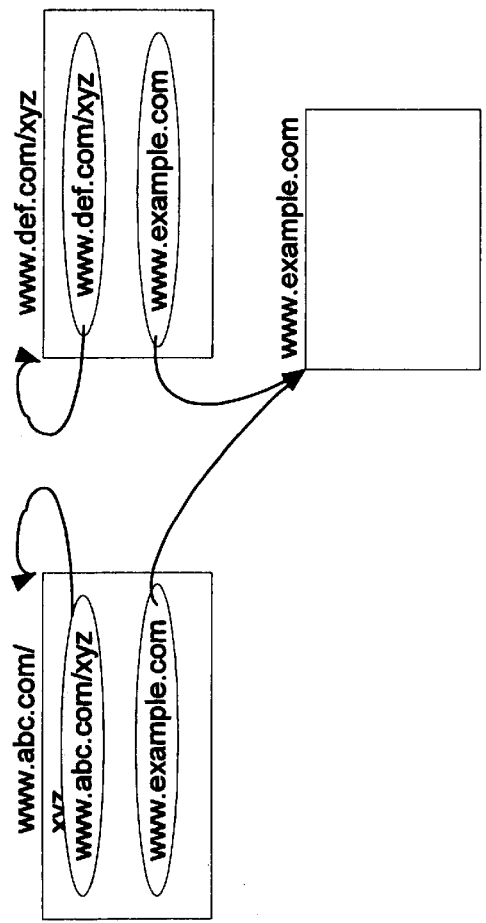
FIG. 10(c) shows another example of connectivity matches at the page level.

Each of the 2*n paths for a host pair is examined in turn in loop 1007. Step 1008 counts what percentage of the links in the page corresponding to the path match (i.e. point to the same place). Links to other documents on the same host will involve the name of the local host and will hence appear to differ. We compensate by removing the hostname from such URLs, effectively turning them into "relative URLs." FIG. 10(b) shows a first example of two pages (www.acb.com/xyz and www.def.com/xyz) that have links to the same third and fourth pages and, thus, "match." Both pages contain a link to document/page www.lmn.com and document/page www.example.com. FIG. 10(c) shows a second example of two pages (www.acb.com/xyz and www.def.com/xyz) that "match." Both pages contain a link to document/page www.example.com and a link to a document/page on the respective mirrored systems (www.abc.com/xyz and www.def.com/xyz). Thus, even though the links to the mirrored systems do not point to the same physical pages, the relative URLs (xyz and xyz) pointed to by the links are the same.

Because content changes over time (e.g., at news hosts) and mirrors engage in local customizations, the set of out-links in replicated documents often varies slightly. Hence, when testing a common path for equivalence we require only that a fraction of the union of the set of out-links from the two versions be common to both (in the described embodiment, this fraction is 0.9). Thus, the links of the common 2*n paths are examined and each of the 2*n paths for the current host pair is determined to match or not match.

Step 1010 determines what percentage of the 2*n common pages for the current host pair "match." If a fraction m of the selected common pages of a host pair are found to be equivalent (m=0.75, for example) then the host pair is allowed to remain in the ranking. Otherwise the host pair is eliminated (filtered).

This method further refines the URL based ranking by filtering host pairs that do not point to a high percentage of the same pages.

2. Hosts Level Connectivity Based Method

FIG. 9(c) is a table of the host level connectivity of the three hosts of FIG. 9(a). In FIG. 9(c), one of the hosts has no links to other hosts and two of the hosts have two links to other hosts. Note that pages on host www.xyz.com have three page-level links to various pages on host www.u-vw.edu (see FIG. 9(b)), but host www.xyz.com has only two host level connections to host www.uwv.edu. This is because pages www.uwv.edu/pqr and www.uvw.edu/abc are both on the host www.uwv.edu and links to both of these pages are counted as one page level connection.

Two hosts are likely to be mirrors if they point to the same document/pages. However, because the input set is incomplete and due to local and temporal variations in content, mirrored hosts tend to have a "similar" rather than identical set of out-links.

Figure 11:
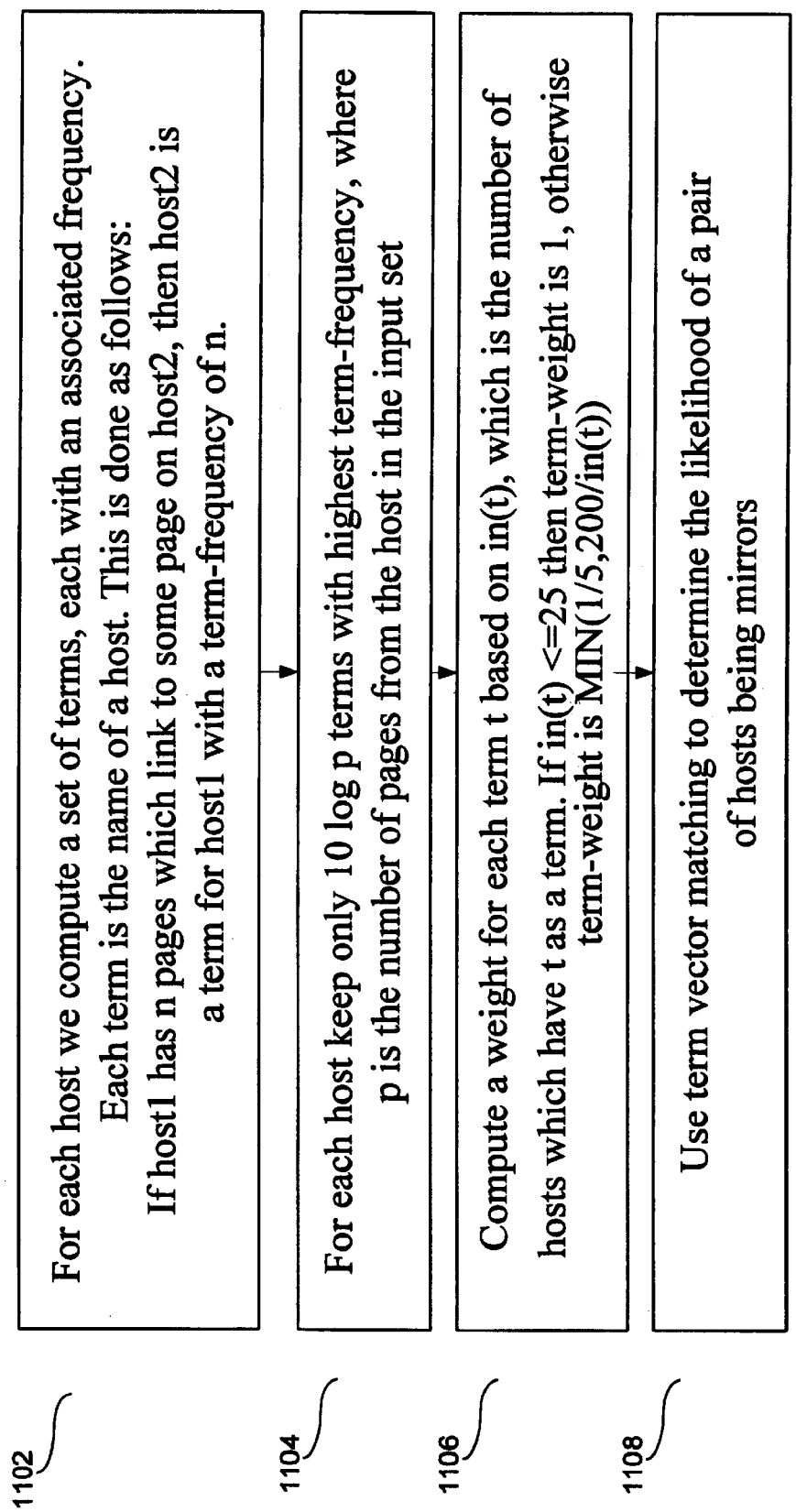
FIG. 11 is a flow chart showing a first method of using connectivity at a host level to detect mirrors.
Figure 12:
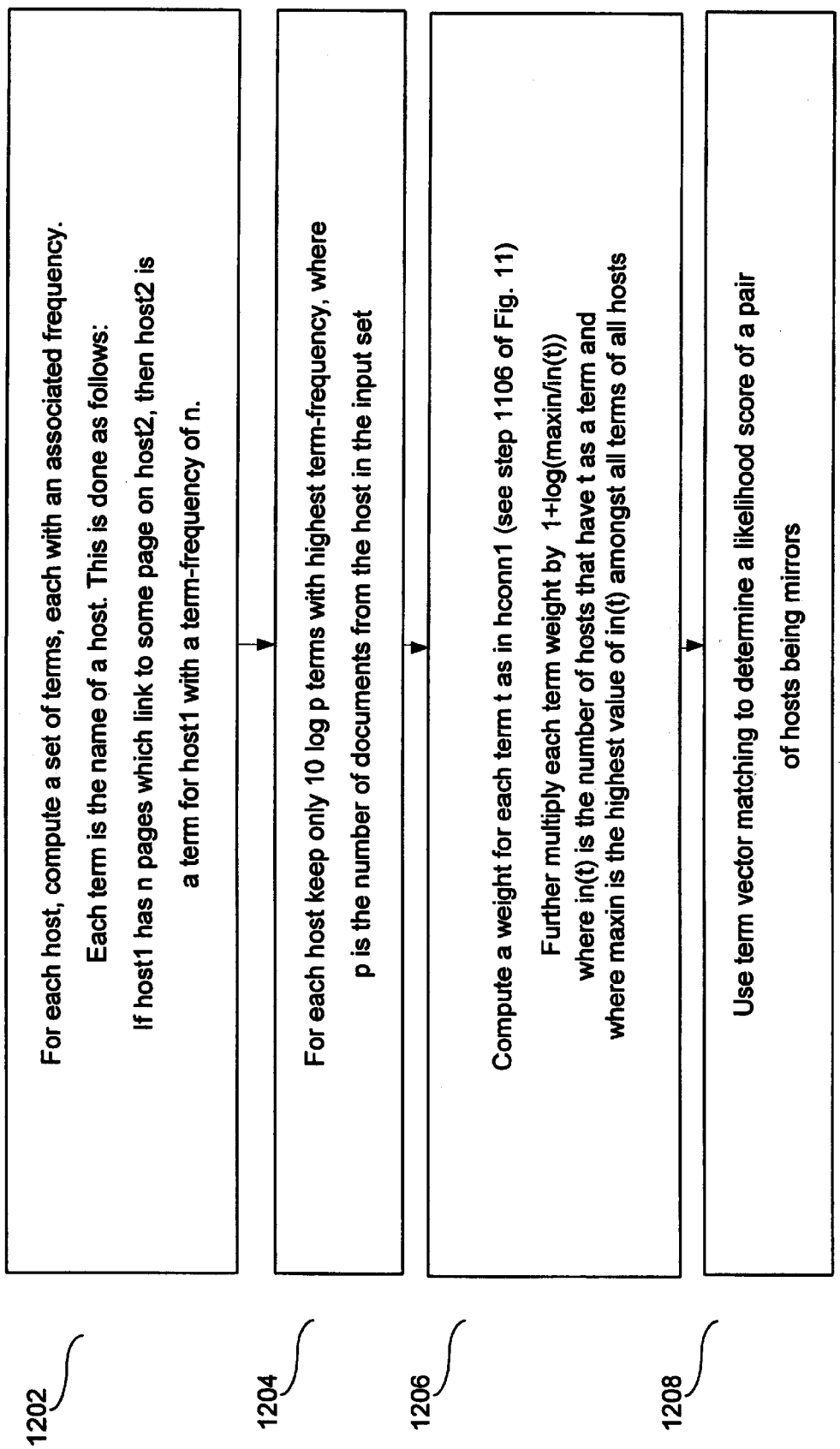
FIG. 12 is a flow chart showing a second method of using connectivity at a host level to detect mirrors.

FIG. 11 is a flow chart showing a first method of using connectivity at a host level to detect mirrors. FIG. 12 is a flow chart showing a second method of using connectivity at a host level to detect mirrors. Both methods use term vector matching to compute the likelihood of a host pair being mirrors. The terms used are a hosts that a host points to. Thus, at host level connectivity, no distinction is made which page within the host contains the link pointing out of the host. Note that the document frequency of a term is precisely the indegree of the host it corresponds to. The term weight is based on inverse document frequency but not on term frequency. This is because many hosts tend to be poorly sampled and hence the method only has a lower bound on term frequencies.

Step 1102 computes a set of terms for each host pair. Each term is the name of a host. This is done as follows: If host1 has n pages which link to some page on host2, then host2 is a term for host1 with a term frequency of n.

However, as shown in step 1104, term frequency is also used in term selection. Initially, the method prunes the hosts by keeping only 10 log p terms with highest term frequency. The value p is the number of pages on that host in the input set.

As shown in step 1106, the method of FIG. 11 ("hconn1") assigns the following term weight to each term t. The indegree in(t) of a host is the number of hosts that have links to it. If the indegree in(t) of host t is at most 25, the term weight is 1. Otherwise, the term weight of host t is min(1/5, 200/in(t)). The term weight is linear in 1/in(t) since computing an approximation of this term weight can be implemented efficiently by allowing the term to appear only in vectors for min(200, in(t)/5) of the hosts chosen at random. Step 1108 uses term vector matching to determine the likelihood of a pair of hosts being mirrors.

FIG. 12 is a flow chart describing a second method of mirror detection using host level connectivity matching. The method of FIG. 12 is also called "hconn2." Steps 1201 through 1204 are similar to step 1101 through 1104 of FIG. 11. In step 1206, a weight for each term t is chosen as in the method of FIG. 11 (see step 1106 of FIG. 11). In addition, each term weight is multiplied by (1+(log(maxin/in(t)))), where in(t) is the number of hosts that have t as a term and where maxin is the highest value of in(t) amongst all terms of all hosts. As in FIG. 11, term vector matching is used to determine a likelihood score of a pair hosts being mirrors.

b. Combined Method for Determining a List of Potential Mirrors

Figure 13A:
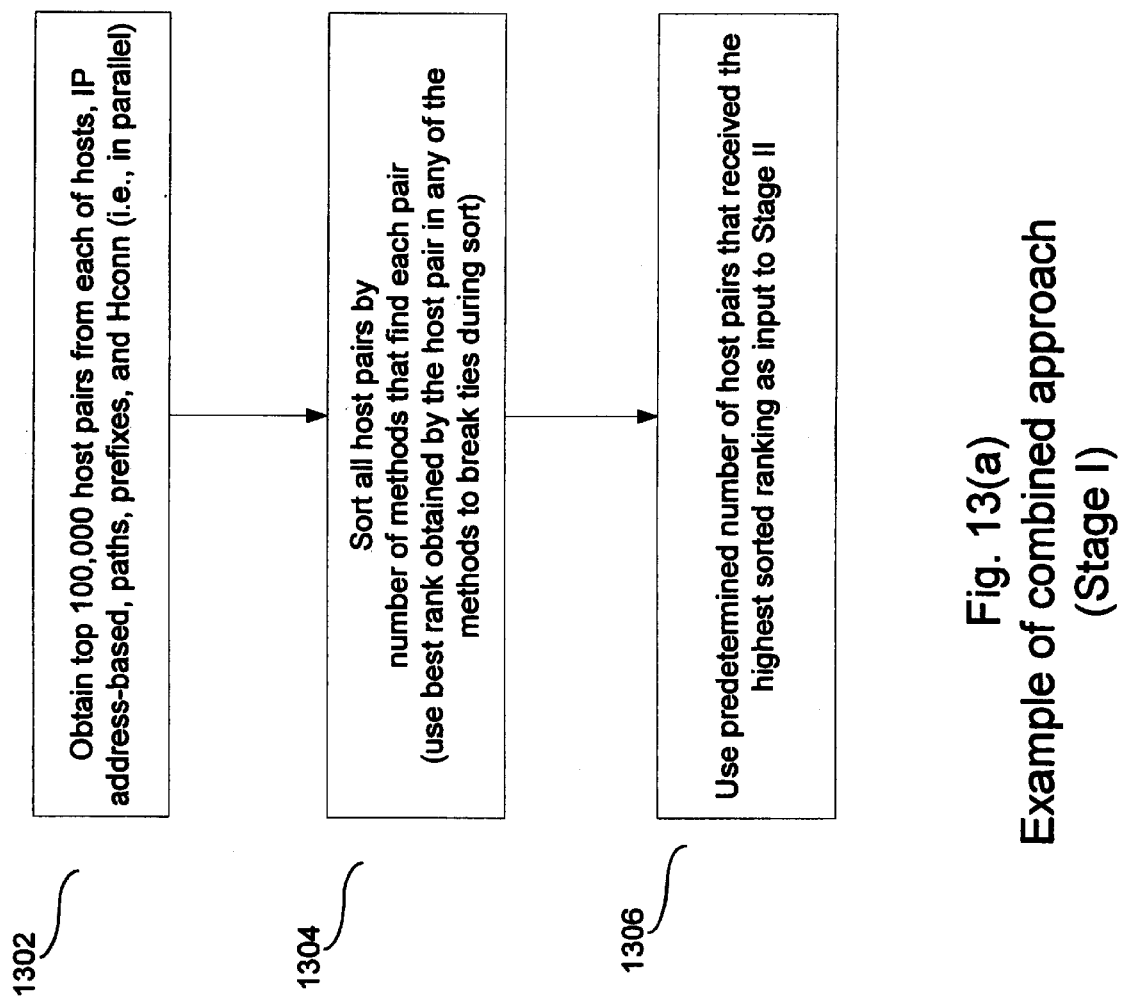
FIG. 13(a) is a flow chart showing an example of a method that combines more than one method of detecting mirrors in a parallel order.
Figure 13B:
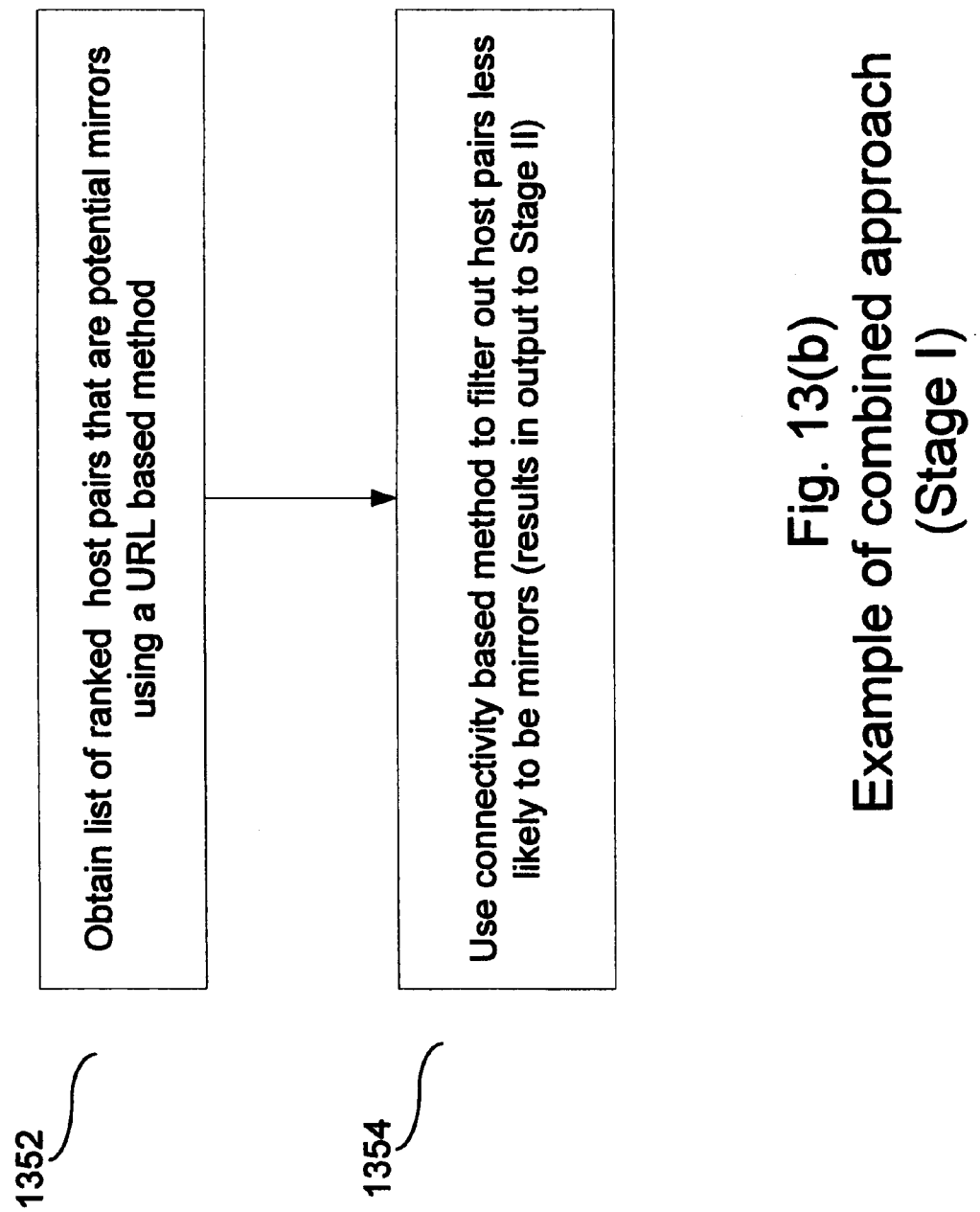
FIG. 13(b) is a flow chart showing an example of a method that combines more than one method of detecting mirrors in a serial order.

FIG. 13(*a*) is a flow chart showing an example of a method that combines more than one method of detecting mirrors in a parallel order. The combination method obtains a top number of host pairs (e.g., 100,000) from each of various Stage I methods. In the example, the URL based method using terms derived from hostnames is a first method used. An IP address based method is the second method used. The third and fourth methods used are URL based methods using paths and prefixes as terms. The fifth method used is one of the above-described hconn methods (see FIGS. 10, 11 and 12). The output of each of these Stage I methods is a list of potential mirrored host pairs. Other appropriate methods for determining pairs of potentially mirrored hosts can be used instead of or in addition to those shown here. In step 1304, all the host pairs are sorted according to the number of methods that found each host pair. Ties are broken using a best rank obtained by each method over each host pair for all methods. Step 1306 uses a predetermined number of the newly sorted host pairs as the output of the combined method. These host pairs can become input to a Stage II method described below.

FIG. 13(*b*) is a flow chart showing an example of a method that combines more than one method of detecting mirrors in a serial order. Step 1352 obtains a list of ranked host pairs that are potential mirrors using a URL based method, such as a method explained above. Step 1354 uses a connectivity based method, such as that described above to filter out host pairs less likely to be mirrors. Step 1354 results in output to Stage II. The method of FIG. 13(*b*) is provided by way of example. In general, a fastest method is used on the initial large set of input data to output a list of sorted potential mirrored hosts pairs. At least one other of the mirroring method or methods described herein are used to filter the sorted hosts pairs.

4. Classifying Potential Host Pairs

Figure 14A:
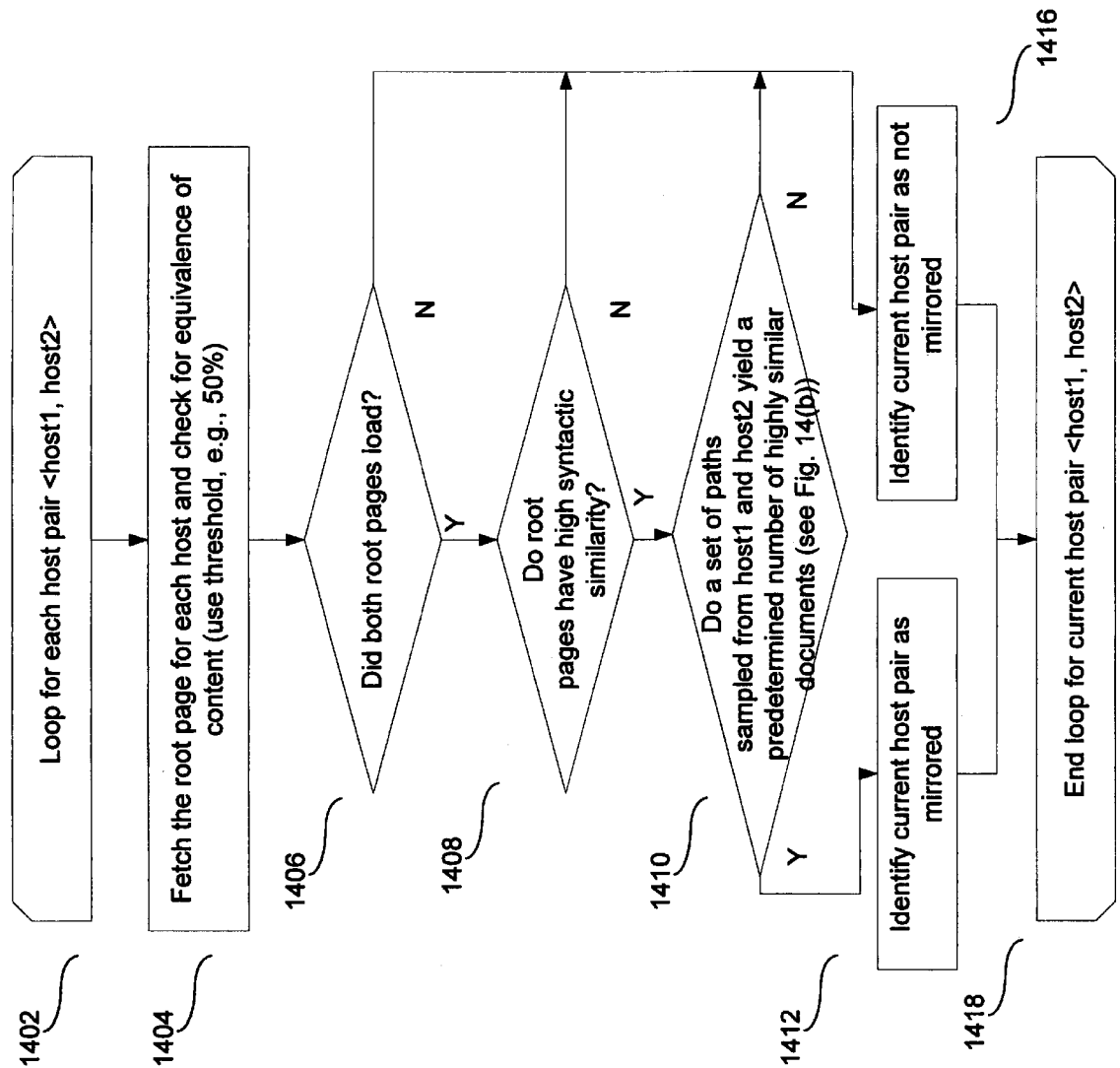
Figure 16B:
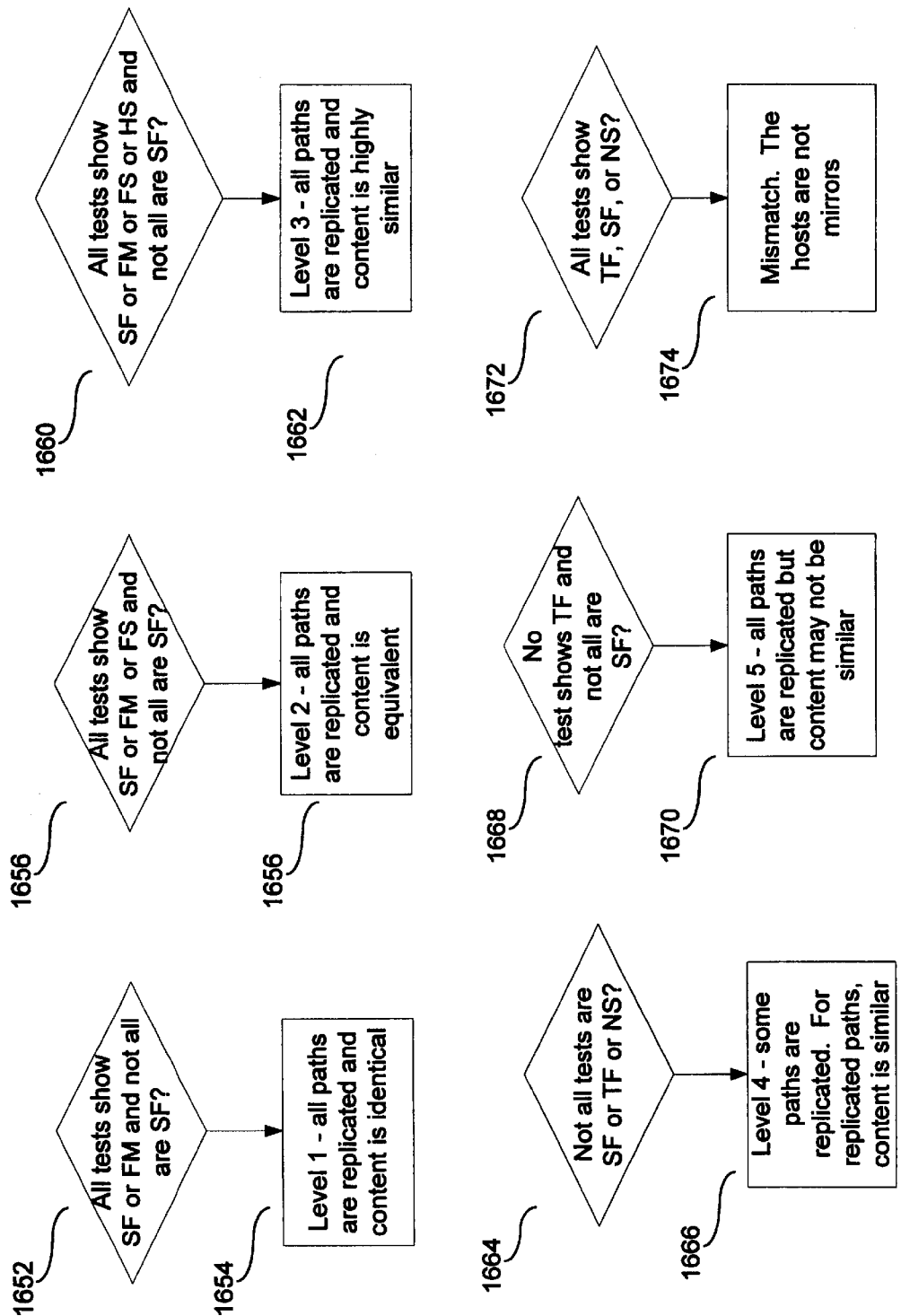
Figure 17:
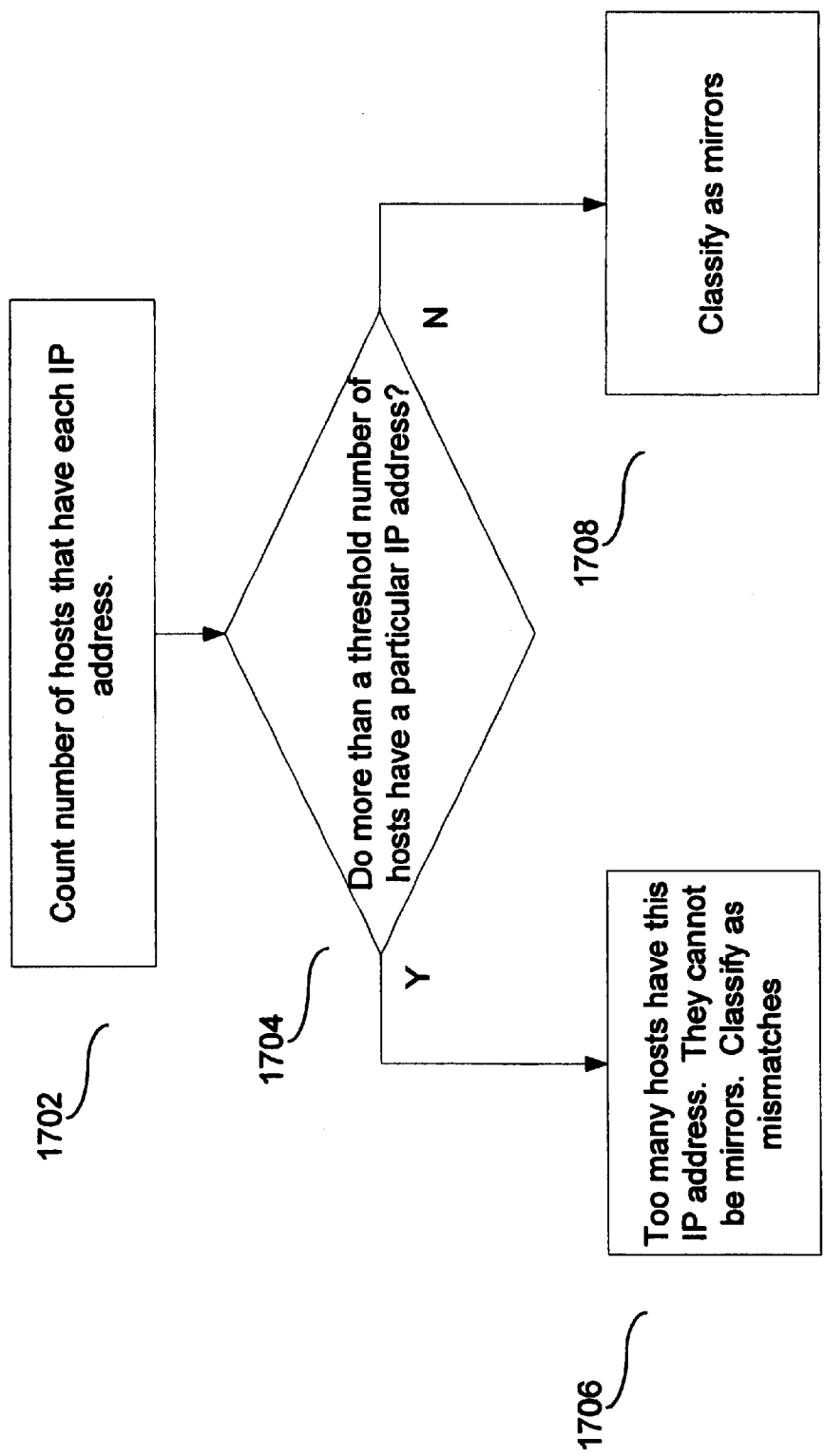
FIG. 17 is a flow chart representing additional details of FIG. 16.

All of the above methods results in a list of prioritized potential mirrored host pairs. The methods described in this section determine whether each potential mirrored host pair are in actuality mirrored hosts. FIGS. 14–15 described a first method that determines whether a host pair is mirrored or not mirrored. FIGS. 16–17 described a second method that outputs a range of classification values ranging from mirrored, through possibly mirrored, through not mirrored.

FIGS. 14(*a*) and 14(*b*) are flow charts showing a method that takes a list of potential pairs of mirrors and examines mirror content and linkage to determine whether each pair represents mirrors. Step 1402 is the beginning of a loop performed for each potential host pair <host1, host2>. Step 1404 fetches a root page for each host and checks for similarity of content in the root pages. In the described embodiment, a 50% content match is required for the root pages to be similar. Note that, in this method, the actual root pages of each host are fetched and the content of the fetched root pages are compared according to the methods described below.

Various methods can be used for determining content match of two pages without departing from the spirit of the invention. In one embodiment, testing is done strictly by finger printing (computing a checksum for each fetched page). In practice, however, the content of even mirrored pages is not fingerprint identical. This can happen even on successive fetches of the same page from the same server, due to variable server-side operations or dynamically-generated web pages. With mirrored content, there is an even greater likelihood of a discrepancy, due to version inconsistencies and local server side operations.

To compensate for this, the content is preferably de-tagged, whitespace is ignored, and a check is done for "syntactic similarity" instead of fingerprint equality. One such syntactic similarity scheme is disclosed in Broder et al, "Syntactic Clustering of the Web," SRC Technical note, 1997-015, Jul. 25, 1997, Digital Equipment Corp, Systems Research Center, Palo Alto, Calif., which is herein incorporated by reference. Another similar scheme is disclosed in the above-referenced U.S. patent application Ser. No. 08/665,709 of Broder et al.

This allows the syntactic similarity between two pages to be computed as a percentage. In addition, at least one embodiment does a DNS lookup on each host to check if the hosts have a common IP address. (When a host has more than one IP address, all are checked to see if at least one is common between the two hosts of the host pair).

If both root pages loaded (step 1406) and the root pages have high syntactic similarity (i.e., >=50%) (step 1408), step 1410 determines if a set of paths sampled from host1 and host2 yields a predetermined number of highly similar documents. Note that, in this method, the exemplary pages from each host are fetched and the content of the fetched pages are compared. (This step is described in more detail in FIG. 14(*b*).) If the set of paths yield highly similar documents, the hosts are identified as mirrored hosts in step 1412. Otherwise, step 1416 determines that the hosts are not mirrored. Step 1418 is the end of the loop.

FIG. 14(*b*) shows an exemplary method for determining whether a set of sampled paths from a host pair yields highly similar documents. The set of sampled paths described here is the set of sampled paths from FIG. 14(*a*). Because a given host may occur in many host pairs, the described embodiment re-uses the same list of sampled paths for a given host. Step 1452 sorts all paths of host1 and host2 lexicographically. These paths are taken from the initial input data about host1 and host2. Thus, step 1452 sorts all known paths on host1 and host2 into respective sorted lists. In the described embodiment, step 1454 samples fifteen paths uniformly from each sorted list of paths. Thus, a total of thirty paths are sampled. These thirty paths represent paths on the two hosts in the host pair being tested. There is no guarantee that the paths correspond to pages present on both hosts. Step 1456 randomly permutes both lists of paths. Step 1458 tests paths alternately from the two permuted lists by attempting to access each tested path on both host1 and on host2. Note that step 1458 actually attempts to access the pages corresponding to the sorted paths.

The remaining steps of FIG. 14(*b*) described the results of this access test. If, in step 1460, the path fails on both hosts, the path is ignored and testing continues with the next path from step 1458. If, in step 1464, the path succeeds on both hosts, but the pages are not highly similar (see above), the method declares a mismatch between these hosts and moves on to the next host pair.

If, in step 1468, the path fails on one host, but not on the other, the method marks this path for later retesting. If, upon later retesting, the path fails on one host but not on the other, a mismatch is declared between the hosts. In this case, it is desirable to test a second time because of the possibility that a failing host was temporarily overloaded or non-operational. Thus, paths that are accessible from one host but not the other are given a second chance. Processing continues with the next path from step 1458.

If, in step 1472, the path succeeds and the fetched pages are highly similar (see above), step 1474 determines whether this is the tenth successful matching path for this host pair. If not, a note is made of the successful match (for example, a counter is incremented) and testing continues with the next path from step 1458. Otherwise, ten highly successful matches have occurred for the current host pair and it is determined that the hosts are mirrors.

FIG. 15 is a flow chart representing additional details of FIG. 14. In the described embodiment, certain additional processing steps occur after the steps of FIGS. 14(*a*) and 14(*b*). For example, if HostA and HostB are mirrors and if HostB and HostC are mirrors, then the method determines that HostA and HostC are also mirrors. Similarly, if HostA and HostB are a mismatch and if HostB and HostC are a mismatch, then HostA and HostC are also a mismatch. These additional steps are omitted from certain other embodiments.

FIGS. 16(*a*) and 16(*b*) are flow charts showing a method that takes a list of potential pairs of mirrors and examines mirror content and linkage to classify the mirror pairs as one of several types of mirrors or non-mirrors. Step 1602 loops for each potential host pair <host1, host2>. As described above, an optional IP address check can also be performed. Step 1604 fetches the root page for each host and checks for equivalence/similarity between the two root pages. In step 1606, the described embodiment separates similarity into similarity categories. In the following a source host is the host on which it is known that the path should exist. (Thus, in the special case of the root pages, there are two source hosts and no target hosts.) The target host is the second host in the host pair.

SF—source failure (access of the path on the source host failed)

T—target failure (access of the path on the target host failed) (cannot happen for root pages since both root pages are sources)

FM—fingerprint match (content of accessed pages are byte-wise identical)

FS—Full similarity (pages are 100% similar after removal of HTML tags, whitespace, etc.)

HS—High similarity (common content on accessed pages above a threshold for high similarity (e.g., 50%))

NS—path is valid on both hosts, but content of accessed pages is not sufficiently similar In the described embodiment, step 1608 samples 9 more paths from each host for a total of 18 additional paths. Thus, each host is a source host for 9 paths and a target hosts for 9 paths. The method attempts to access each of the 18 paths on the source and target hosts and assigns a syntactic similarity category to each path (for 18 paths, 36 page accesses will be attempted). Step 1610 classifies each host pair as shown in more detail in FIG. 17. Step 1612 ends the loop.

FIG. 17 is a flow chart representing additional details of FIG. 16. Each of the 20 paths for a host pair (two root paths and 18 sampled paths) has returned a similarity score using, for example, the similarity score method disclosed in above-referenced. U.S. patent application Ser. No. 08/665,709 of Broder et al. Any other appropriate similarity scoring method could be used.

If, in step 1652, all tests show SF or FM and not all are SF, the host pair is assigned level 1 similarity (i.e., all paths are replicated and content is identical). If, in step 1656, all tests show SF or FM or FS and not all are SF, the host pair is assigned level 2 similarity (i.e., all paths are replicated and content is equivalent). If, in step 1660, all tests show SF or FM or FS or HS and not all are SF, the host pair is assigned level 3 similarity (i.e., all paths are replicated and content is highly similar). If, in step 1664, not all tests are SF or TF or NS, the host pair is assigned level 4 similarity (i.e., for replicated paths, content is similar). If, in step 1668, no test shows TF and not all show SF, the host pair is assigned level 5 similarity (i.e., all paths are replicated but content may not be similar). If, in step 1672, all tests show TF, SF, or NS the hosts are not mirrors.

The mirror categories of FIG. 17 are useful in sophisticated applications where a determination of mirror/no mirror may not be sufficient.

While the invention has been described in conjunction with a specific embodiment, it is evident that many alternatives, modifications and variations will be apparent to those skilled in the art in light of the foregoing description. For example, term vectors can be built according to several methods at once, or methods can be combined in some combination of serial and/or parallel combinations. Accordingly, it is intended to embrace all such alternatives, modifications and variations as fall within the spirit and scope of the appended claims and equivalents.

What is claimed is:

1. A method of determining mirrored web sites, comprising:

receiving information about a plurality of web sites stored on a plurality of hosts;

determining a list of host pairs that are potentially mirrored hosts, wherein mirrored hosts contain highly similar documents within the same path; and analyzing the list of pairs of potential mirrored hosts to determine which of the host pairs are mirrored hosts.

2. The method of claim 1, wherein the determination uses a method based on the IP address of the hosts.

3. The method of claim 1, wherein the determination uses a method based on the URLs of the hosts.

4. The method of claim 1, wherein the determination uses a method based on the URLs and the page level connectivity of the hosts.

5. The method of claim 1, wherein the determination uses a method based on the host level connectivity of the hosts.

6. The method of claim 1, wherein the determination uses a combination of a method based host level connectivity of the hosts and a URL based method.

7. The method of claim 1, wherein the determination uses a method based on a combination of IP based methods, URL based methods, and connectivity based methods performed in parallel.

8. The method of claim 1, wherein the determination uses a method based on a combination of IP based methods, URL based methods, and connectivity based methods performed serially.

9. The method of claim 1, further comprising:
receiving information about the IP addresses of the plurality of web sites stored on the plurality of hosts;
determining clusters of hosts, where all web sites in a cluster have the same IP addresses; and
determining that the hosts in clusters of hosts having less than or equal to a threshold number of hosts therein are mirrored web hosts.

10. The method of claim 9, wherein at least the first three octets of the IP address of all hosts in a cluster are identical.

11. A method of determining mirrored web hosts, comprising:
receiving information about the addresses of a plurality of web sites stored on a plurality of hosts and about page level connectivity information of the plurality of web sites and a list of potentially mirrored hosts pairs, wherein mirrored hosts contain highly similar documents within the same path; and
filtering the list of potential mirrored hosts pairs in accordance with the page level connectivity information, wherein mirrored hosts contain highly similar documents within the same path.

12. The method of claim 11, further comprising, prior to filtering the list of potential mirrored hosts, of using a URL based method in accordance with the received address information to generate the list of potentially mirrored host pairs.

13. The method of claim 11, wherein filtering the list of potential hosts pairs includes:
selecting, for a host pair, 2*n page paths known to be present on both hosts in the host pair and having a high outdegree;
for each of the 2*n page paths, counting a percentage of outgoing links common to the two pages corresponding to a page path; and
determining that if the counted percentage is greater than a threshold, that the page paths "match."

14. The method of claim 13, further including:
determining what percentage of the 2*n page paths for a particular host pair "match"; and
if the percentage is above a certain threshold, determining that the host pair represents potential mirrored hosts.

15. The method of claim 13, further including:
before determining a "match" between pages corresponding to a page path, if the page path points to one of the hosts in the host pair, removing the part of the URL for the host, resulting in a relative URL.

16. A method of determining mirrored web hosts, comprising:
receiving information about the addresses of a plurality of web sites stored on a plurality of hosts and about connectivity information of the plurality of web sites;
for each host, determining a set of terms for the host, indicating those hosts that are targets of incoming links from some page on the host;
for each term, determining the frequency, which equals the number of such incoming links;
for each host, selecting the terms with the highest frequency;
for each host, weighting the terms; and
using term vector matching to determine the likelihood of a pair of hosts being mirrors in accordance with the weighted terms of the pair of hosts.

17. The method of claim 16, wherein weighting the term includes:
using a weighting function based on an indegree of the term.

18. The method of claim 16, wherein weighting the term includes using a weighting function of:
if in(t)<=25 then term-weight is 1, otherwise term-weight is MIN(1/5,200/in(t)), where in(t) of a host t is the number of hosts that have links to it.

19. The method of claim 16, wherein weighting the term includes using a weighting function of:
if in(t)<=25 then term-weight is 1, otherwise term-weight is MIN(1/5,200/in(t)), where in(t) of a host t is the number of hosts that have links to it; and further multiplying each term weight by 1+log(maxin/in(t)), where in(t) of a host t is the number of hosts that have links to it, where maxin is the highest value of in(t) amongst all terms of all hosts.

20. The method of claim 1, wherein the analyzing step attempts to access selected pages on each host from both hosts to determine whether the hosts are mirrored hosts.

21. The method of claim 1, wherein the analyzing step further includes:
attempting to access pages from both hosts corresponding to paths selected from each of the hosts to determine whether the hosts are mirrored hosts;
categorizing the selected pages as having various matching categories; and
categorizing the hosts pairs in one of a plurality of similarity categories in accordance with the matching categories of the selected pages.

22. The method of claim 21, wherein the matching categories indicate one of: access of the path on the source host failed; access of the path on the target host failed; content is byte-wise identical; documents are 100% similar after removal of HTML tags, whitespace, etc.; common content above a threshold for high similarity (e.g., 50%); and path is valid but no similarity.

23. The method of claim 21, wherein the host pairs are divided into five similarity categories in accordance with the matching categories of the selected pages.

24. An apparatus that determines mirrored web sites, comprising:
software configured to receive information about a plurality of web sites stored on a plurality of hosts;
software configured to determine a list of host pairs that are potentially mirrored hosts, wherein mirrored hosts contain highly similar documents within the same path; and
software configured to analyze the list of pairs of potential mirrored hosts to determine which of the host pairs are mirrored hosts.

25. The apparatus of claim 24, further comprising:
software configured to receive information about the IP addresses of the plurality of web sites stored on the plurality of hosts;
software configured to determine clusters of hosts, where all web sites in cluster have the same IP addresses; and
software configured to determine that the hosts in clusters of hosts having less than or equal to a threshold number of hosts therein are mirrored web hosts.

26. An apparatus that determines mirrored web hosts, comprising:

software configured to receive information about the addresses of a plurality of web sites stored on a plurality of hosts and about page level connectivity information of the plurality of web sites and a list of potentially mirrored hosts pairs, wherein mirrored hosts contain highly similar documents within the same path; and software configured to filter the list of potential mirrored hosts pairs in accordance with the page level connectivity information.

27. An apparatus that determines mirrored web hosts, comprising:

software configured to receive information about the addresses of a plurality of web sites stored on a plurality of hosts and about connectivity information of the plurality of web sites;

software configured to, for each host, determine a set of terms for the host, indicating those hosts that are targets of incoming links from some page on the host;

software configured to, for each term, determine the frequency, which equals the number of such incoming links;

software configured to, for each host, select the terms with the highest frequency;

software configured to, for each host, weight the terms; and software configured to use term vector matching to determine the likelihood of a pair of hosts being mirrors in accordance with the weighted terms of the pair of hosts.

28. A computer program product, comprising:

computer program code devices configured to receive information about a plurality of web sites stored on a plurality of hosts;

computer program code devices configured to determine a list of host pairs that are potentially mirrored hosts, wherein mirrored hosts contain highly similar documents within the same path; and computer program code devices configured to analyze the list of pairs of potential mirrored hosts to determine which of the host pairs are mirrored hosts.

29. The computer program product of claim 28, further comprising:

computer program code devices configured to receive information about the IP addresses of the plurality of web sites stored on the plurality of hosts;

computer program code devices configured to determine clusters of hosts, where all web sites in cluster have the same IP addresses; and computer program code devices configured to determine that the hosts in clusters of hosts having less than or equal to a threshold number of hosts therein are mirrored web hosts.

30. A computer program product, comprising:

computer program code devices configured to receive information about the addresses of a plurality of web sites stored on a plurality of hosts and about page level connectivity information of the plurality of web sites and a list of potentially mirrored hosts pairs, wherein mirrored hosts contain highly similar documents within the same path; and computer program code devices configured to filter the list of potential mirrored hosts pairs in accordance with the page level connectivity information.

31. A computer program product, comprising:

computer program code devices configured to receive information about the addresses of a plurality of web sites stored on a plurality of hosts and about connectivity information of the plurality of web sites;

computer program code devices configured to, for each host, determine a set of terms for the host, indicating those hosts that are targets of incoming links from some page on the host;

computer program code devices configured to, for each term, determine the frequency, which equals the number of such incoming links;

computer program code devices configured to, for each host, select the terms with the highest frequency;

computer program code devices configured to, for each host, weight the terms; and computer program code devices configured to use term vector matching to determine the likelihood of a pair of hosts being mirrors in accordance with the weighted terms of the pair of hosts.

* * * * *

UNITED STATES PATENT AND TRADEMARK OFFICE
CERTIFICATE OF CORRECTION

PATENT NO. : 6,487,555 B1
DATED : November 26, 2002
INVENTOR(S) : Krishna A. Bharat et al.

It is certified that error appears in the above-identified patent and that said Letters Patent is hereby corrected as shown below:

<u>Title page,</u>
Item [56], OTHER PUBLICATIONS, insert:

-- Andrei Z. Broder et al., SRC Technical Note "Syntactic Clustering of the Web", July 25, 1997, 7-page document.

Gerard Salton, et al., "Term-Weighting Approaches in Automatic Text Retrieval," Information Processing Management, Vol. 24, No. 5, Copyright © 1988, November 1987, 11-page document.

Narayanan Shivakumar et al., "Finding near-replicas of documents on the web," Department of Computer Science, Stanford, CA 94305, three-page document.

Karen Sparck Jones and Peter Willett, "Readings in Information Retrieval," Morgan Kaufman Publishers, July 1997, Copyright © 1997, 589-page book. --

Signed and Sealed this

Twentieth Day of May, 2003

JAMES E. ROGAN
*Director of the United States Patent and Trademark Office*